United States Patent
Yoshikaie

(10) Patent No.: US 12,498,562 B2
(45) Date of Patent: Dec. 16, 2025

(54) DISPLAY APPARATUS

(71) Applicant: SONY GROUP CORPORATION, Tokyo (JP)

(72) Inventor: Akira Yoshikaie, Tokyo (JP)

(73) Assignee: Sony Group Corporation, Tokyo (JP)

(*) Notice: Subject to any disclaimer, the term of this patent is extended or adjusted under 35 U.S.C. 154(b) by 561 days.

(21) Appl. No.: 17/996,111

(22) PCT Filed: Mar. 12, 2021

(86) PCT No.: PCT/JP2021/010102
§ 371 (c)(1),
(2) Date: Oct. 13, 2022

(87) PCT Pub. No.: WO2021/220638
PCT Pub. Date: Nov. 4, 2021

(65) Prior Publication Data
US 2023/0204948 A1    Jun. 29, 2023

(30) Foreign Application Priority Data
Apr. 28, 2020 (JP) ................. 2020-078975

(51) Int. Cl.
*G02B 27/00* (2006.01)
*F21V 8/00* (2006.01)
*G02B 27/01* (2006.01)

(52) U.S. Cl.
CPC ....... *G02B 27/0081* (2013.01); *G02B 6/0031* (2013.01); *G02B 6/005* (2013.01); *G02B 27/0172* (2013.01); *G02B 2027/0187* (2013.01)

(58) Field of Classification Search
CPC .. G02B 27/0081; G02B 6/0031; G02B 6/005; G02B 27/0172; G02B 2027/0187;
(Continued)

(56) References Cited

U.S. PATENT DOCUMENTS 8,233,204 B1 * 7/2012 Robbins ................. G02B 27/01
359/566
10,379,358 B2 * 8/2019 Olkkonen ............ G02B 6/0038
(Continued)

FOREIGN PATENT DOCUMENTS

| JP | 2009-186794 | 8/2009 |
| JP | 2015-087581 | 5/2015 |

(Continued)

OTHER PUBLICATIONS

International Search Report and Written Opinion prepared by the Japan Patent Office on May 12, 2021, for International Application No. PCT/JP2021/010102, 2 pgs.

*Primary Examiner* — Collin X Beatty
(74) *Attorney, Agent, or Firm* — SHERIDAN ROSS P.C.

(57) ABSTRACT

To provide a display apparatus that can display an image at a wide angle of view while preventing the display apparatus from being made larger in size. The present technology provides a display apparatus that includes a light-emitting system that emits image light that includes a plurality of pieces of light of different wavelengths; a light guiding system that guides the image light emitted by the light-emitting system; and a light deflecting system that deflects the plurality of pieces of light included in the image light guided by the light guiding system, and causes the plurality of pieces of deflected light to be incident on an eyeball from different directions. The present technology makes it possible to provide a display apparatus that can display an image at a wide angle of view while preventing the display apparatus from being made larger in size.

20 Claims, 27 Drawing Sheets

(58) Field of Classification Search
CPC .............. G02B 26/101; G02B 27/1086; G02B 27/4211; G02B 27/4272; G02B 27/0093; G02B 2027/0112; G02B 2027/0174
See application file for complete search history.

(56) References Cited

U.S. PATENT DOCUMENTS

| | | | |
|---|---|---|---|
| 2010/0066926 A1* | 3/2010 | Tanijiri | G02F 1/13362 349/11 |
| 2012/0218481 A1* | 8/2012 | Popovich | G02B 5/1819 349/11 |
| 2015/0116357 A1 | 4/2015 | Moriya et al. | |
| 2018/0081176 A1 | 3/2018 | Olkkonen et al. | |

FOREIGN PATENT DOCUMENTS

| | | |
|---|---|---|
| JP | 2015-102613 | 6/2015 |
| JP | 2015-194550 | 11/2015 |
| JP | 2018-513414 | 5/2018 |
| WO | WO 2019/235320 | 12/2019 |

* cited by examiner

DISPLAY APPARATUS

CROSS REFERENCE TO RELATED APPLICATIONS

This application is a national stage application under 35 U.S.C. 371 and claims the benefit of PCT Application No. PCT/JP2021/010102, having an international filing date of 12 Mar. 2021, which designated the United States, which PCT application claimed the benefit of Japanese Patent Application No. 2020-078975, filed 28 Apr. 2020, the entire disclosures of each of which are incorporated herein by reference.

TECHNICAL FIELD

The technology according to the present disclosure (hereinafter also referred to as the "present technology") relates to a display apparatus.

BACKGROUND ART

Conventionally, a display apparatus that causes an image to be visually confirmed by guiding image light such that the image light is incident on an eyeball, is known (for example, refer to Patent Literature 1).

CITATION LIST

Patent Literature

Patent Literature 1: Japanese Patent Application Laid-open No. 2015-194550

DISCLOSURE OF INVENTION

Technical Problem

However, existing technologies result in there being room for improvement in displaying an image at a wide angle of view while preventing an apparatus from being made larger in size.

Thus, it is a primary object of the present technology to provide a display apparatus that can display an image at a wide angle of view while preventing the display apparatus from being made larger in size.

Solution to Problem

The present technology provides a display apparatus that includes
- a light-emitting system that emits image light that includes a plurality of pieces of light of different wavelengths;
- a light guiding system that guides the image light emitted by the light-emitting system; and
- a light deflecting system that deflects the plurality of pieces of light included in the image light guided by the light guiding system, and causes the plurality of pieces of deflected light to be incident on an eyeball from different directions.

The light guiding system may include a light guiding plate, and an entrance optical system that causes the image light emitted by the light-emitting system to enter the light guiding plate; and the image light entering the light guiding plate through the entrance optical system may propagate through the light guiding plate while being totally reflected within the light guiding plate.

The light deflecting system may include a diffractive section group including a plurality of diffractive sections and successively selectively diffracting the plurality of pieces of light included in the image light propagating through the light guiding plate while being totally reflected within the light guiding plate.

Diffractive sections of the plurality of diffractive sections may be provided at different positions on a propagation route of the image light in the light guiding plate, and at least two of the diffractive sections of the plurality of diffractive sections may have wavelength selective properties with respect to different wavelengths from among wavelengths of the plurality of pieces of light included in the image light.

Diffractive sections of the plurality of diffractive sections may be provided at different positions on a propagation route of the image light in the light guiding plate, and at least two of the diffractive sections of the plurality of diffractive sections may have wavelength selective properties with respect to the same wavelength from among wavelengths of the plurality of pieces of light included in the image light.

The diffractive section group may diffract at least two of the plurality of pieces of light included in the image light such that the at least two of the plurality of pieces of light included in the image light are headed for one position on the eyeball.

The diffractive section group may diffract at least two of the plurality of pieces of light included in the image light such that the at least two of the plurality of pieces of light included in the image light are headed for different positions on the eyeball.

The plurality of diffractive sections may include a diffractive section including a plurality of diffractive structures arranged in a layered formation in a thickness direction of the light guiding plate, and diffractive structures of the plurality of diffractive structures may have wavelength selective properties with respect to different wavelengths from among wavelengths of the plurality of pieces of light included in the image light.

The plurality of diffractive sections may include a diffractive section in which a plurality of diffraction patterns is formed, and diffraction patterns of the plurality of diffraction patterns may have wavelength selective properties with respect to different wavelengths from among wavelengths of the plurality of pieces of light included in the image light.

A portion of the plurality of diffractive sections may be provided to a surface of the light guiding plate that is situated relatively close to the eyeball, and another portion of the plurality of diffractive sections may be provided to a surface of the light guiding plate that is situated relatively away from the eyeball.

The entrance optical system may include an optical member that causes the image light emitted by the light-emitting system to enter the light guiding plate at an angle of incidence at which the image light is totally reflected within the light guiding plate.

The optical member may be a reflective mirror.

The image light emitted by the light-emitting system may be transmitted through the light guiding plate to be incident on the reflective mirror.

The light-emitting system may include an image light generator that generates the image light, and an optical system that guides the image light generated by the image light generator to the entrance optical system.

The optical system may include a diffusion member that is arranged in a path of the image light between the image light generator and the entrance optical system and diffuses the image light.

The optical system may include a scanning optical element that is arranged in a path of the image light between the image light generator and the entrance optical system and scans the image light.

The optical system may include a chromatic-aberration-correction diffractive section that is arranged in a path of the image light between the image light generator and the entrance optical system and corrects a chromatic aberration.

The optical system may include a chromatic-aberration-correction diffractive section that is arranged in a path of the image light between the image light generator and the scanning optical element and corrects a chromatic aberration.

The optical system may include an optical element that is arranged in a light path between the image light generator and the entrance optical system, and a drive section that is capable of changing a position of the optical element, a pose of the optical element, or both the position and the pose.

The display apparatus may further include a line-of-sight detecting system that detects a line of sight that corresponds to an orientation of the eyeball; and a control system that controls the drive section on the basis of a result of the detection performed by the line-of-sight detecting system.

MODE(S) FOR CARRYING OUT THE INVENTION

Figure 1:
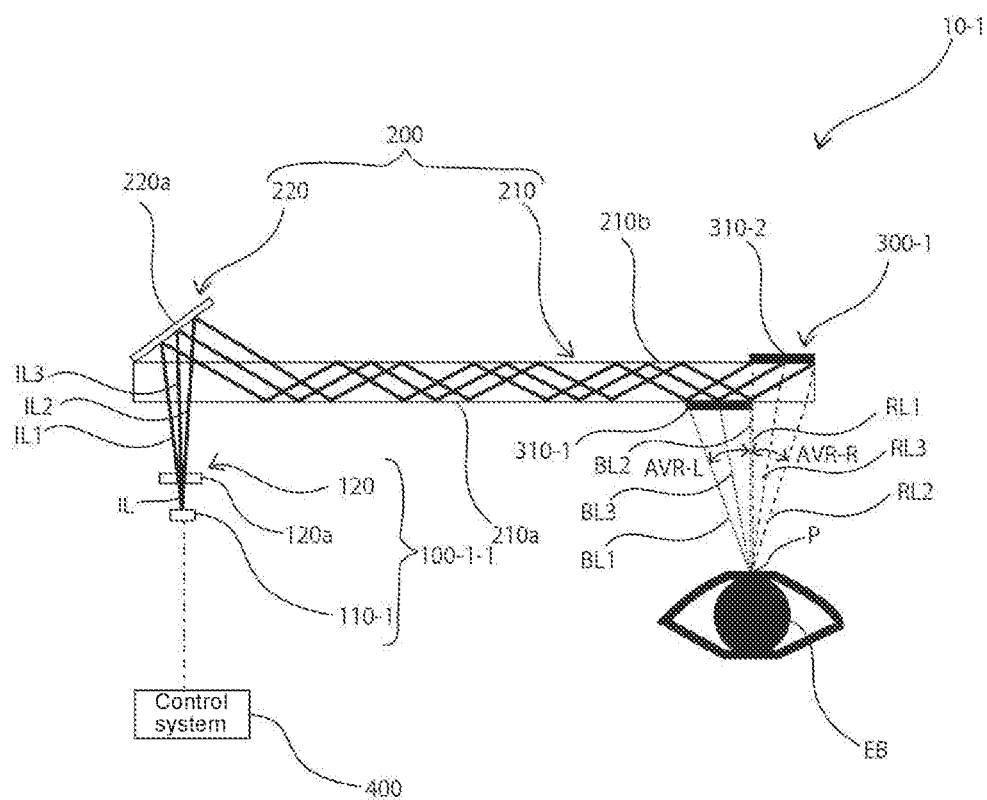
FIG. 1 illustrates a configuration of a display apparatus according to a first example of a first embodiment of the present technology.

Favorable embodiments of the present technology will now be described below in detail with reference to the accompanying drawings. Note that, in the specification and the drawings, components having substantially the same functional configuration are denoted by the same reference numeral to omit a repetitive description. The embodiments described below are examples of representative embodiments of the present technology, and the scope of the present technology is not construed as being limited to the embodiments. Even when an example in which a display apparatus according to the present technology provides a plurality of effects is described herein, it is sufficient if the display apparatus according to the present technology provides at least one of the plurality of effects. Effects described herein are not limitative but are merely illustrative, and other effects may be provided.

Note that the description is made in the following order.
1. Display Apparatus According to First Embodiment of Present Technology
2. Display Apparatus According to Second Embodiment of Present Technology
3. Display Apparatus According to Third Embodiment of Present Technology
4. Display Apparatus According to Fourth Embodiment of Present Technology
5. Modifications of Present Technology 1. <Display Apparatus According to First Embodiment of Present Technology>

A display apparatus 10 according to a first embodiment of the present technology is described with reference to the drawings.

The display apparatus 10 is used for the purpose of providing, for example, augmented reality (AR) or virtual reality (VR) to a user.

In each figure, a left side as viewed from the surface of the sheet of the figure is hereinafter defined as "left", a right side as viewed from the surface of the sheet of the figure is hereinafter defined as "right", a side in front as viewed from the surface of the sheet of the figure is hereinafter defined as "upward", and a side in back as viewed from the surface of the sheet of the figure is hereinafter defined as "downward" for convenience of description.

[Configuration of Display Apparatus According to First Example of First Embodiment]

FIG. 1 illustrates a configuration of a display apparatus 10-1 of a first example that is an example of the display apparatus 10 according to the first embodiment.

The display apparatus 10-1 serves as a head-mounted display (HMD) that is used by being worn on the head of a user. The HMD is also called, for example, eyewear.

The display apparatus 10-1 includes a light-emitting system 100-1-1, a light guiding system 200, and a light deflecting system 300-1.

The display apparatus 10-1 may further include a control system 400.

The light-emitting system 100-1-1, the light guiding system 200, and the light deflecting system 300-1 are integrally provided to one support structure (such as a frame of glasses).

The control system 400 may be integrally provided to the support structure, or may be provided separately from the support structure.

In the following description, a frame of glasses that is an example of the support structure is assumed to be worn on the head of a user.

(Light-Emitting System)

The light-emitting system 100-1-1 emits image light IL that includes a plurality of pieces of light of different wavelengths.

The light-emitting system 100-1-1 includes an image light generator 110-1 and an optical system 120.

The image light generator 110-1 generates the image light IL. The image light IL is light used to display image information in the field of view of a user.

The optical system 120 guides the image light IL generated by the image light generator 110-1 to an entrance optical system 220 of the light guiding system 200 that will be described later.

Figure 2:
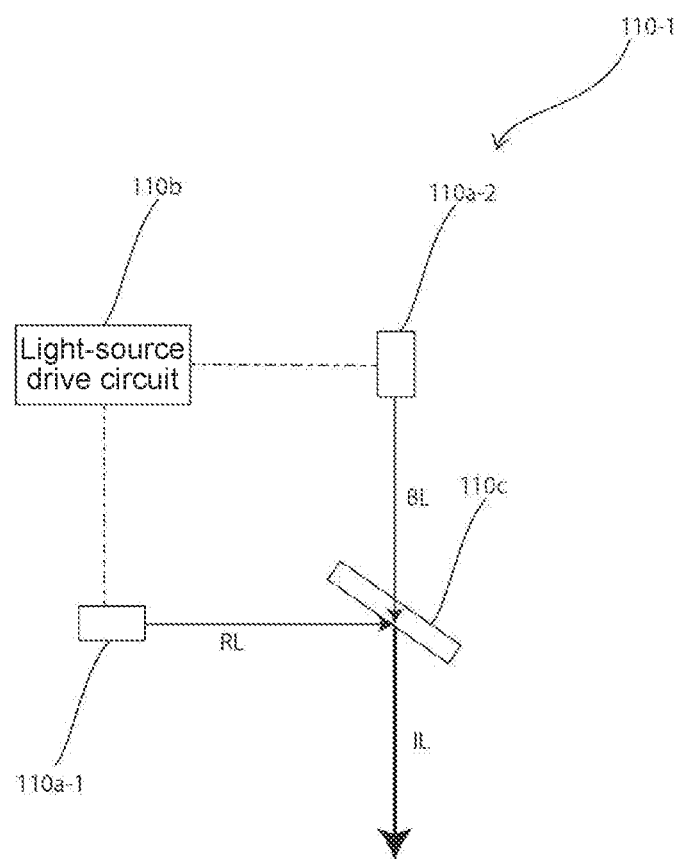
FIG. 2 illustrates a configuration of an image light generator of the display apparatus according to the first example of the first embodiment of the present technology.

As illustrated in FIG. 2, the image light generator 110-1 includes a plurality of (for example, two) light sources 110a including first and second light sources 110a-1 and 110a-2 of different emission wavelengths, a light-source drive circuit 110b (a light source driver) that drives the plurality of light sources 110a, and a light combining element 110c that combines pieces of light from the plurality of light sources 110a.

Examples of each light source 110a include an edge-emitting laser (LD), a surface-emitting laser (VCSEL), a light-emitting diode (LED), and an organic EL element.

The first light source 110a-1 emits, for example, red light RL. The second light source 110a-2 emits, for example, blue light BL.

The first and second light sources 110a-1 and 110a-2 are arranged such that paths of respective pieces of emitted light intersect.

The light-source drive circuit 110b drives the respective light sources 110a on the basis of modulation data that is transmitted from the control system 400 and will be described later.

The light path combining element 110c is provided at an intersection of a path of red light RL from the first light source 110a-1 and a path of blue light BL from the second light source 110a-2.

The light path combining element 110c is a dichroic mirror, in which one of the incident red light RL and blue light BL (for example, the blue light BL) is transmitted through the light path combining element 110c, and another of the incident red light RL and blue light BL (for example, the red light BL) is reflected off the light path combining element 110c.

Light (combining light) obtained by the red light RL and the blue light BL being combined by the light combining element 110c is the image light IL generated by the image light generator 110-1.

Note that a lens may be arranged in a light path between each light source 110a and the light combining element 110c.

Returning to FIG. 1, the optical system 120 includes a diffusion member 120a that diffuses the image light IL (the combining light from the light combining element 110c) generated by the image light generator 110-1. For example, a diffusion plate or a microlens array through which the image light IL is transmitted is used as the diffusion member 120a. Note that, for example, a diffusion plate, a micromirror array, or a freeform surface mirror off which the image light IL is reflected may be used as the diffusion member 120a.

The image light IL generated by the image light generator 110-1 and diffused by the diffusion member 120a is the image light IL emitted by the light-emitting system 100-1-1. This image light IL enters the light guiding system 200. The diffused image light IL can be considered a collection of a plurality of beams, and each beam is also referred to as the image light IL.

For example, three pieces of image light IL illustrated in FIG. 1 are also respectively referred to as first image light IL1, second image light IL2, and third image light IL3. FIG. 1 only illustrates the three pieces of image light IL for convenience of description, but a greater number of pieces of image light IL are actually generated.

(Light Guiding System)

The light guiding system 200 guides the image light emitted by the light-emitting system 100-1-1.

The light guiding system 200 includes a light guiding plate 210, and the entrance optical system 220 causing the image light IL emitted by the light-emitting system 100-1-1 to enter the light guiding plate 210.

The light guiding plate 210 is, for example, a transparent, semitransparent, or opaque glass plate. The light guiding plate 210 may be fitted into a frame of glasses that serves as the support structure (a type of lens of glasses), or may be externally attached to the frame of glasses (a combiner type).

A transparent or semitransparent glass plate is used as the light guiding plate 210 when, for example, augmented reality (AR) is provided to a user.

An opaque glass plate is used as the light guiding plate 210 when, for example, virtual reality (VR) is provided to a user.

The image light IL entering the light guiding plate 210 through the entrance optical system 220 propagates through the light guiding plate 210 while being totally reflected within the light guiding plate 210. In other words, the image light IL propagates zigzag through the light guiding plate 210.

Specifically, the entrance optical system 220 includes an optical member 220a that causes the image light IL emitted by the light-emitting system 100 to enter the light guiding plate 210 at an angle of incidence at which the image light IL is totally reflected within the light guiding plate 210.

As an example, a position and a pose of the optical member 220a with respect to the light guiding plate 210 are set such that the angle of incidence of the image light IL on the light guiding plate 210 satisfies total-reflection conditions for light being totally reflected at sides of surfaces of the light guiding plate 210 that are substantially parallel to each other, where one of the surfaces is a surface 210a in front that will be described later, and another of the surfaces is a surface 210b in back that will be described later.

For example, the optical member 220a is integrally provided to the light guiding plate 210.

For example, the optical member 220a is a reflective mirror (also referred to as a "reflective mirror 220a").

As an example, the diffusion member 120a being an emission end of the light-emitting system 100-1-1, and the optical member 220a are arranged such that a left end portion (one of end portions) of the light guiding plate 210 is situated between the diffusion member 120a and the optical member 220a.

In this case, the image light IL emitted by the light-emitting system 100-1-1 is transmitted through the left end portion of the light guiding plate 210 to be incident on the optical member 220a.

(Light Deflecting System)

The light deflecting system 300-1 deflects a plurality of pieces of light included in the image light IL guided by the light guiding system 200, and causes the plurality of pieces of deflected light to be incident on an eyeball EB of a user from different directions.

As an example, the light deflecting system 300-1 includes a diffractive section group that includes a plurality of (for example, two) diffractive sections 310 including first and second diffractive sections 310-1 and 310-2.

As an example, the diffractive section group successively selectively diffracts a plurality of (for example, two) pieces of light (for example, blue light BL and red light RL) included in the image light IL propagating through the light guiding plate 210 while being totally reflected within the light guiding plate 210.

As an example, at least one diffractive section 310 (for example, the first and second diffractive sections 310-1 and 310-2) included in the diffractive section group is arranged at a position (for example, a right end portion (another of the end portions) of the light guiding plate 210) at which the diffractive section 310 faces the eyeball EB.

The diffractive sections 310 of the plurality of diffractive sections 310 are arranged at different positions on a propagation route of the image light IL in the light guiding plate 210. Note that the "propagation route of image light IL" refers to a route on which at least one of the plurality of pieces of light being included in the image light IL and having different wavelengths propagates.

At least two of the plurality of diffractive sections 310 (for example, the first and second diffractive sections 310-1 and 310-2) have wavelength selective properties with respect to different wavelengths from among wavelengths of the plurality of pieces of light included in the image light IL.

In other words, the at least two of the plurality of diffractive sections 310 (for example, the first and second diffractive sections 310-1 and 310-2) each have a wavelength selective property of selectively diffracting a piece of light of a specific wavelength from among the plurality of pieces of light included in the image light IL, and wavelengths of pieces of light selectively diffracted by the at least two of the plurality of diffractive sections 310 are different from each other.

For example, the first diffractive section 310-1 has a wavelength selective property of selectively diffracting blue light BL from among entering light.

For example, the second diffractive section 310-2 has a wavelength selective property of selectively diffracting red light RL from among the entering light.

A diffraction power that causes corresponding light to be diffracted is distributed in an in-plane direction of each diffractive section 310. A diffraction direction in which each diffractive section 310 diffracts corresponding light (a direction in which the corresponding light diffracted by the diffractive section is incident on one of or another of the surfaces of the light guiding plate 210) is a direction that does not satisfy the total-reflection conditions for light being totally reflected within the light guiding plate 210.

Thus, corresponding light diffracted by each diffractive section 310 is not totally reflected within the light guiding plate 210, and gets out of the light guiding plate 210.

For example, light diffracted by a left end portion of the first diffractive section 310 gets out of the light guiding plate 210 to form a left end of the angle of view.

Light diffracted by a right end portion of the first diffractive section 310-1 gets out of the light guiding plate 210 to form the center of the angle of view.

For example, light diffracted by a left end portion of the second diffractive section 310-2 gets out of the light guiding plate 210 to form the center of the angle of view.

For example, light diffracted by a right end portion of the second diffractive section 310-2 gets out of the light guiding plate 210 to form a right end of the angle of view.

As described above, the pieces of light each forming a portion of the angle of view are incident on the eyeball EB from different directions.

In the diffractive section group, a distribution of a diffraction power of each diffractive section 310 is set such that at least two of the plurality of pieces of light (for example, all of the plurality of pieces of light) included in the image light IL are diffracted to be headed for one position P on the eyeball EB.

In other words, the diffractive section group concentrates the at least two of the plurality of pieces of light (for example, all of the plurality of pieces of light) included in the image light IL at the one position P on the eyeball EB.

For example, each diffractive section 310 may be formed by processing the surface of the light guiding plate 210, or may be attached to the surface of the light guiding plate 210. For example, each diffractive section 310 is also referred to as a diffractive optical element (DOE) or a holographic optical element (HOE).

As an example, a portion of the plurality of diffractive sections 310 (for example, the first diffractive section 310-1) is provided to the surface (a surface in front as viewed from the eyeball EB) 210a being included in the light guiding plate 210 and situated relatively close to the eyeball EB. Another portion of the plurality of diffractive sections 310 (for example, the second diffractive section 310-2) is provided to the surface (a surface in back as viewed from the eyeball EB) 210b being included in the light guiding plate 210 and situated relatively away from the eyeball EB.

For example, the first diffractive section 310-1 is arranged at a first position that is a position situated on the propagation route of the image light IL and on the surface 210a in front being included in the light guiding plate 210. In this case, the first diffractive section 310-1 transmissively diffracts blue light BL from among entering light.

For example, the second diffractive section 310-2 is arranged at a second position that is a position situated on the propagation route of the image light IL and on the surface 210b in back being included in the light guiding plate 210. In this case, the second diffractive section 310-2 reflectively diffracts red light RL from among the entering light.

The first position is situated further upstream of the propagation route of the image light IL than the second position. In other words, at least portions of the first and second diffractive sections 310-1 and 310-2 do not face each other.

For example, the first and second positions are total-reflection positions situated one after another on the propagation route of the image light IL.

(Control System)

The control system 400 comprehensively controls the entirety of the display apparatus 10-1. The control system 400 is implemented by hardware such as a CPU and a chip set.

The control system 400 generates modulation data on the basis of image data input by an external apparatus or input through a network, and transmits the generated data to the light-source drive circuit 110b (refer to FIG. 2).

[Operation Performed by Display Apparatus According to First Example of First Embodiment]

An operation performed by the display apparatus 10-1 of the first example is described below.

First, an operation common to the respective pieces of image light IL is described.

The respective pieces of image light IL (the three pieces of image light IL1 to IL3 are illustrated in FIG. 1) emitted by the light-emitting system 100-1-1 are transmitted through one of the end portions (the left end portion) of the light guiding plate 210 to be incident on the reflective mirror 220a. The image light IL reflected off the reflective mirror 220a enters the one of the end portions of the light guiding plate 210 at an angle of incidence at which the image light IL is totally reflected at the sides of the surface 210a in front and the surface 210b in back being included in the light guiding plate 210. The image light IL entering the one of the end portions of the light guiding plate 210 propagates through the light guiding plate 210 while being totally reflected within the light guiding plate 210 to be headed for another of the end portions of the light guiding plate 210, and is incident on the first diffractive section 310-1. Blue light BL from among the image light IL incident on the first diffractive section 310-1 is transmissively diffracted by the first diffractive section 310-1 to be headed for the position P on the eyeball EB, and is incident on the position P. Red light RL incident on the first diffractive section 310-1 is totally reflected at the side of the surface 210a in front being included in the light guiding plate 210, and is incident on the second diffractive section 310-2. The red light RL incident on the second diffractive section 310-2 is reflectively diffracted by the second diffractive section 310-2, and then is refracted by the surface 210a in front being included in the light guiding plate 210 to be incident on the position P on the eyeball EB.

As described above, blue light BL and red light RL included in each piece of image light IL are incident on one position P on the eyeball EB from different directions. This results in being able to cause a user to visually confirm a color image made up of combining light obtained by combining the blue light BL and the red light RL.

Next, operations respectively performed with respect to the first to third pieces of image light IL1 to IL3 are described.

The first image light IL1 emitted by the light-emitting system 100-1-1 most closely to a left end surface of the light guiding plate 210 enters the light guiding plate 210 through the reflective mirror 220a. Thereafter, the first image light IL1 propagates through the light guiding plate 210 while being totally reflected within the light guiding plate 210 to be incident on the left end portion of the first diffractive section 310-1. Blue light BL1 from among the first image light IL1 incident on the left end portion of the first diffractive section 310-1 is transmissively diffracted by the left end portion of the first diffractive section 310-1 to be headed for the position P on the eyeball EB such that the blue light BL1 forms a left end of a left angle-of-view range AVR-L (a maximum angle of view on the left of all of the angle-of-view ranges), and the blue light BL1 is incident on the position P. Red light RL1 from among the first image light IL1 incident on the left end portion of the first diffractive section 310-1 is totally reflected at the side of the surface 210a in front being included in the light guiding plate 210, and is incident on the left end portion of the second diffractive section 310-2. The red light RL1 incident on the left end portion of the second diffractive section 310-2 is reflectively diffracted by the left end portion of the second diffractive section 310-2 to be headed for the position P on the eyeball EB such that the red light RL1 forms a right end of the left angle-of-view range AVR-L (an angle-of-view center in all of the angle-of-view ranges), and the red light RL1 is incident on the position P on the eyeball EB.

The second image light IL2 emitted by the light-emitting system 100 farthest from the left end surface of the light guiding plate 210 enters the light guiding plate 210 through the reflective mirror 220a. Thereafter, the second image light IL2 propagates through the light guiding plate 210 while being totally reflected within the light guiding plate 210 to be incident on the right end portion of the first diffractive section 310-1. Blue light BL2 from among the second image light IL2 incident on the right end portion of the first diffractive section 310-1 is transmissively diffracted by the right end portion of the first diffractive section 310-1 to be headed for the position P on the eyeball EB such that the blue light BL2 forms a left end of a right angle-of-view range AVR-R (the angle-of-view center in all of the angle-of-view ranges), and the blue light BL2 is incident on the position P. Red light RL2 from among the second image light IL2 incident on the right end portion of the first diffractive section 310-1 is totally reflected at the side of the surface 210a in front being included in the light guiding plate 210, and is incident on the right end portion of the second diffractive section 310-2. The red light RL2 incident on the right end portion of the second diffractive section 310-2 is diffracted by the right end portion of the second diffractive section 310-2 such that the red light RL2 forms a right end of the right angle-of-view range AVR-R (the maximum angle of view on the right of all of the angle-of-view ranges). Thereafter, the red light RL2 is refracted by the surface 210a in front being included in the light guiding plate 210, and is incident on the position P on the eyeball EB.

The third image light IL3 emitted by the light-emitting system 100-1-1 between the first image light IL1 and the second image light IL2 enters the light guiding plate 210 through the reflective mirror 220a. Thereafter, the third image light IL3 propagates through the light guiding plate 210 while being totally reflected within the light guiding plate 210 to be incident on a portion intermediate between the left end portion and the right end portion of the first diffractive section 310-1. Blue light BL3 from among the third image light IL3 incident on the intermediate portion of the first diffractive section 310-1 is transmissively diffracted to be headed for the position P on the eyeball EB such that the blue light BL3 forms the center of the left angle-of-view range AVR-L (an intermediate angle of view in all of the angle-of-view ranges, where the blue light BL3 corresponds to a line intermediate between a line forming the maximum angle of view on the left and a line forming the angle-of-view center in all of the angle-of-view ranges), and the blue light BL3 is incident on the position P. Red light RL3 from among the third image light IL3 incident on the intermediate portion of the first diffractive section 310-1 is totally reflected at the side of the surface 210a in front being included in the light guiding plate 210, and is incident on a portion intermediate between the left end portion and the right end portion of the second diffractive section 310-2. The red light RL3 incident on the intermediate portion of the second diffractive section 310-2 is diffracted by the intermediate portion of the second diffractive section 310-2 such that the red light RL3 forms the center of the right angle-of-view range AVR-R (the intermediate angle of view in all of the angle-of-view ranges, where the red light RL3 corresponds to a line intermediate between a line forming the maximum angle of view on the right and the line forming the angle-of-view center in all of the angle-of-view ranges). Thereafter, the red light RL3 is refracted by the surface 210a in front being included in the light guiding plate 210, and is incident on the position P on the eyeball EB.

[Effects Provided by Display Apparatus According to First Example of First Embodiment]

Effects provided by the display apparatus 10-1 of the first example are described below.

The display apparatus 10-1 according to the first example of the first embodiment includes the light-emitting system 100-1-1 emitting the image light IL including a plurality of pieces of light of different wavelengths, the light guiding system 200 guiding the image light IL emitted by the light-emitting system 100-1-1, and the light deflecting system 300-1 deflecting the plurality of pieces of light included in the image light IL guided by the light guiding system 200 to cause the plurality of pieces of deflected light to be incident on the eyeball EB from different directions.

In this case, an angle of view can be formed using a plurality of pieces of light of different wavelengths.

Consequently, the display apparatus 10-1 makes it possible to provide a display apparatus that can display an image at a wide angle of view while preventing the display apparatus from being made larger in size.

Figure 3:
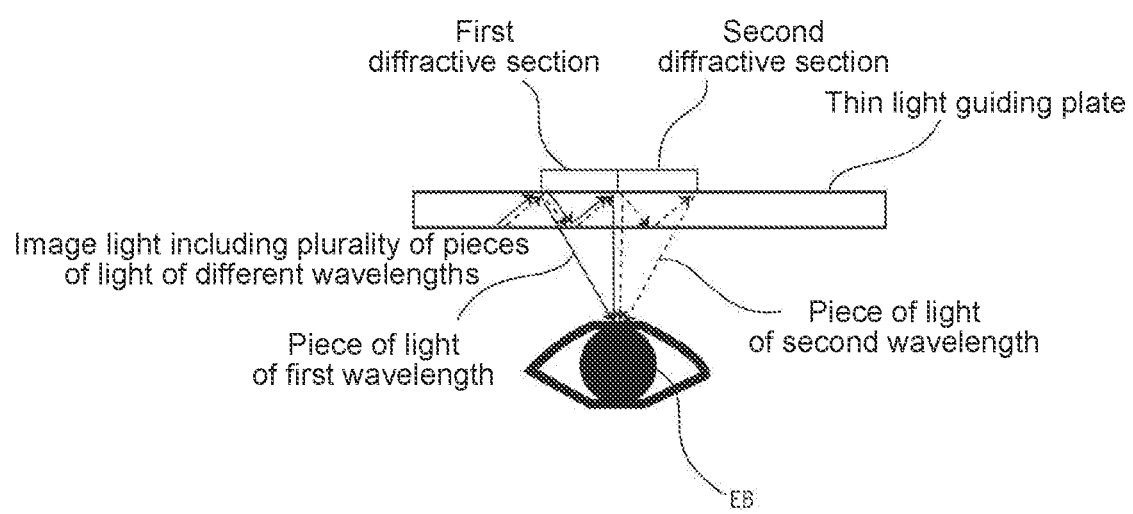
FIG. 3 is a diagram used to describe a method for guiding image light according to the present technology.

Supplementarily, for example, as illustrated in FIG. 3, the display apparatus 10-1 makes it possible to form an angle of view using a plurality of pieces of light of different wavelengths, and thus to form a wide angle of view even if the width of a back-and-forth movement of light guided by the light guiding system 200 is small (for example, even if a light guiding plate is thin).

Figure 4:
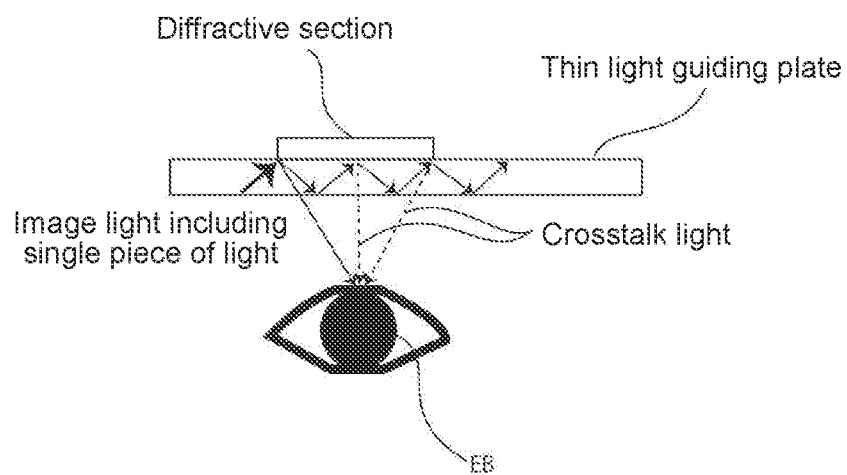
FIGS. 4 A and B of FIG. 4 are diagrams used to describe the method for guiding image light respectively according to first and second comparative examples.
Figure 4:
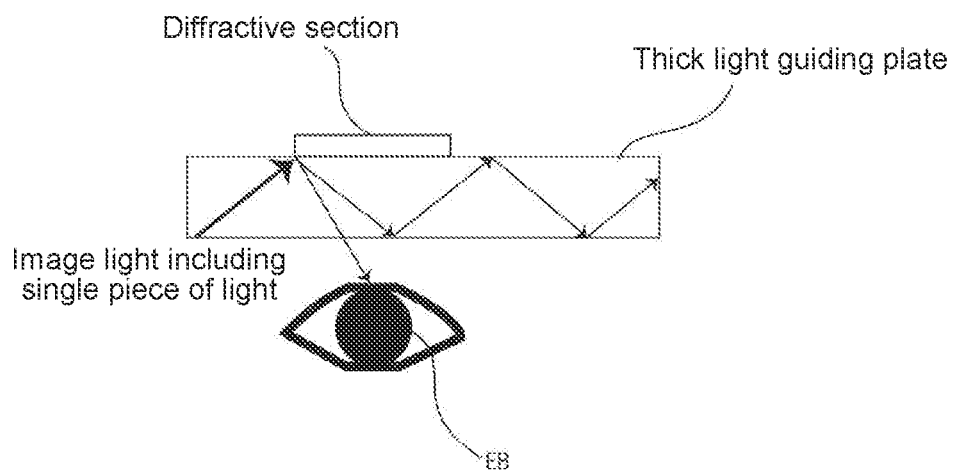

On the other hand, when, as in the case of, for example, a first comparative example illustrated in A of FIG. 4, a single piece of light is diffracted by a diffractive section to form an angle of view that is identical to the angle of view illustrated in FIG. 3, and when the width of a back-and-forth movement of light guided by the light guiding system 200 is small (for example, when a light guiding plate is thin), image light including the same information is incident on an eyeball at different angles, and this results in the occurrence of crosstalk. Thus, in order to suppress the occurrence of the crosstalk, there is a need to make the width of a back-and-forth movement of light larger (for example, to make a light guiding plate thicker), as in the case of a second comparative example illustrated in B of FIG. 4. This results in making an apparatus larger in size.

The light-emitting system 100-2-1 emits the plurality of image light IL including the first to third pieces of image light IL1 to IL3. This makes it possible to display a high-resolution image at a wide angle of view.

The light guiding system 200 includes the light guiding plate 210, and the entrance optical system 220 causing the image light IL emitted by the light-emitting system 100-1-1 to enter the light guiding plate 210. The image light IL entering the light guiding plate 210 through the entrance optical system 220 propagates through the light guiding plate 210 while being totally reflected within the light guiding plate 210. This makes it possible to cause the image light IL to propagate in a state of being confined in the light guiding plate 210, and thus to suppress a reduction in the beam quality of the image light IL.

The light deflecting system 300-1 includes a diffractive section group including a plurality of diffractive sections 310 and successively selectively diffracting a plurality of pieces of light included in the image light IL propagating through the light guiding plate 210 while being totally reflected within the light guiding plate 210. This makes it possible to efficiently form a wide angle of view using the propagation of the image light IL.

The diffractive sections of the plurality of diffractive sections 310 are arranged at different positions on the propagation route of the image light IL in the light guiding plate 210. At least two of the plurality of diffractive sections 310 have wavelength selective properties with respect to different wavelengths from among wavelengths of the plurality of pieces of light included in the image light IL. Consequently, pieces of light of the plurality of pieces of light included in the image light IL propagating through the light guiding plate 210 while being totally reflected within the light guiding plate 210 can be successively diffracted by the respective diffractive sections 310.

The diffractive section group diffracts at least two of the plurality of pieces of light included in the image light IL such that the at least two of the plurality of pieces of light included in the image light IL are headed for one position P on the eyeball. This results in being able to display a color image made up of combining light obtained by combining a plurality of pieces of light of different wavelengths.

A portion of the plurality of diffractive sections 310 is provided to the surface being included in the light guiding plate 210 and situated relatively close to the eyeball EB. Another portion of the plurality of diffractive sections 310 is provided to the surface being included in the light guiding plate 210 and situated relatively away from the eyeball EB. This results in being able to form an angle of view by, for example, successively diffracting pieces of light of the plurality of pieces of light included in the image light IL propagating through the light guiding plate 210 while being totally reflected within the light guiding plate 210.

The entrance optical system 220 includes the optical member 220a (such as a reflective mirror) causing the image light IL emitted by the light-emitting system 100-1-1 to enter the light guiding plate 210 at an angle of incidence at which the image light IL is totally reflected within the light guiding plate 210. This enables the image light IL to be stably totally reflected within the light guiding plate 210.

The image light IL emitted by the light-emitting system 100-1-1 is transmitted through the light guiding plate 210 to be incident on the reflective mirror. This makes it possible to make the apparatus smaller in size.

The light-emitting system 100-1-1 includes the image light generator 110-1 generating the image light IL, and the optical system 120 guiding the image light IL generated by the image light generator 110-1 to the entrance optical system 220.

The optical system 120 includes the diffusion member 120a being arranged in the path of image light IL between the image light generator 110-1 and the entrance optical system 220, and diffusing the image light IL. This results in being able to generate the image light IL making it possible to perform display at a high resolution using a simple configuration.

[Display Apparatus According to Second Example of First Embodiment]

A display apparatus 10-2 according to a second example of the first embodiment of the present technology is described with reference to FIG. 5.

Figure 5:
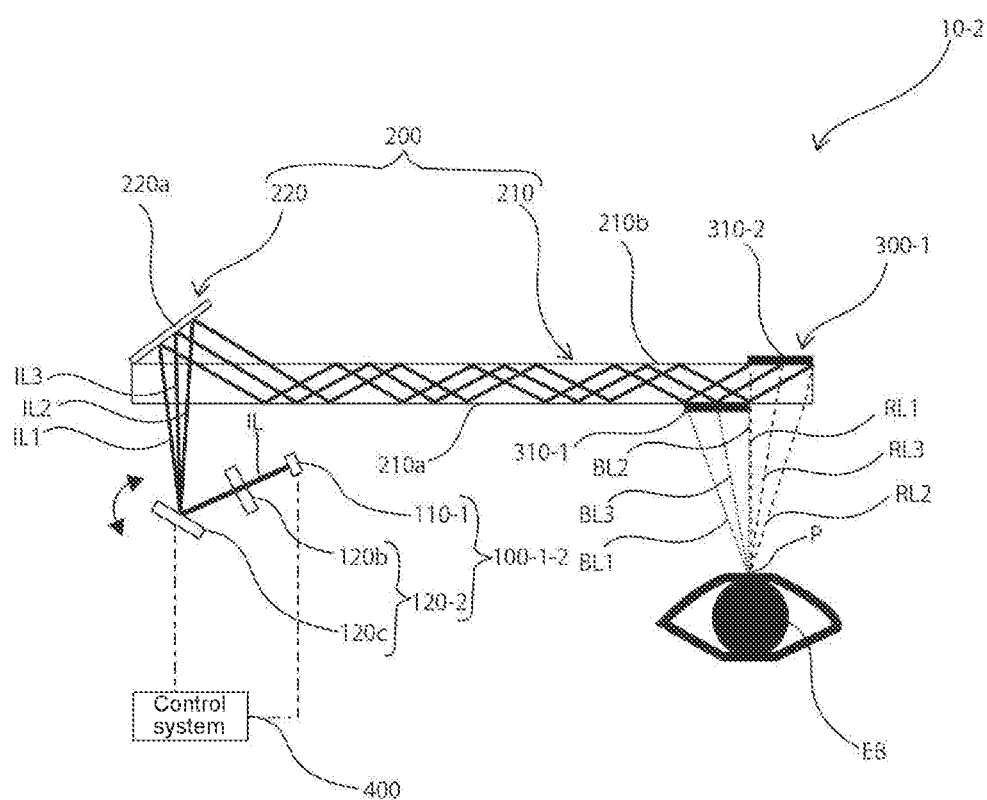
FIG. 5 illustrates a configuration of a display apparatus according to a second example of the first embodiment of the present technology.

As illustrated in FIG. 5, the display apparatus 10-2 of the second example has a configuration similar to the configuration of the display apparatus 10-1 of the first example except for the configuration of a light-emitting system.

A light-emitting system 100-1-2 of the display apparatus 10-2 includes an optical system 120-2 that includes a scanning optical element 120c that is arranged in a path of image light IL between the image light generator 110-1 and the reflective mirror 220a, and a light concentration optical element 120b that is arranged in the path of the image light IL between the image light generator 110-1 and the scanning optical element 120c.

The scanning optical element 120c is a light deflector that includes a movable mirror, such as a MEMS mirror, a galvanometer mirror, or a polygon mirror, that can be moved about two axes (for example, a certain axis that is vertical to the surface of the sheet of FIG. 5, and another axis that is orthogonal to the certain axis) that are orthogonal to each other. Note that the scanning optical element 120c may include a first movable mirror that can be moved about a certain axis, and a second movable mirror that can be moved about another axis that is orthogonal to the certain axis.

For example, the light concentration optical element 120b is a condenser or a light concentration mirror. The light concentration optical element 120b concentrates the image light IL from the image light generator 110-1 onto the scanning optical element 120c.

In the display apparatus 10-2, the image light IL generated by the image light generator 110-1 is incident on the scanning optical element 120c through the light concentration optical element 120b. The image light IL incident on the scanning optical element 120c is deflected by the scanning optical element 120c to be incident on the reflective mirror 220a. This results in the image light IL being scanned over the reflective mirror 220a.

The display apparatus 10-2 can provide effects substantially similar to the effects provided by the display apparatus 10-1 of the first example, and makes it possible to control respective pieces of scanning light (respective pieces of image light IL) individually.

[Display Apparatus According to Third Example of First Embodiment]

A display apparatus 10-3 according to a third example of the first embodiment of the present technology is described with reference to FIG. 6.

Figure 6:
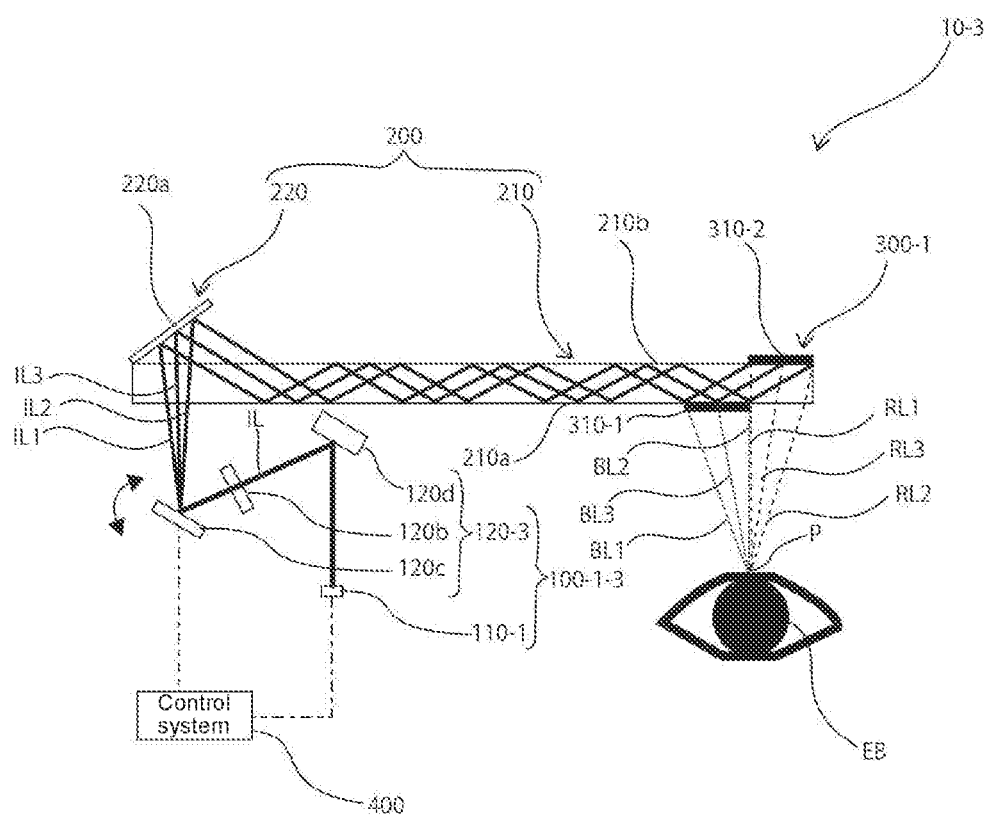
FIG. 6 illustrates a configuration of a display apparatus according to a third example of the first embodiment of the present technology.

As illustrated in FIG. 6, the display apparatus 10-3 of the third example has a configuration similar to the configuration of the display apparatus 10-2 of the second example except for the configuration of a light-emitting system.

In addition to the configuration of the light-emitting system 100-1-2 of the second example, a light-emitting system 100-1-3 included in the display apparatus 10-3 includes a chromatic-aberration-correction diffractive section 120d in a path of image light IL between the image light generator 110-1 and the reflective mirror 220a.

It is favorable that the chromatic-aberration-correction diffractive section 120d be arranged in the path of the image light IL between the image light generator 110-1 and the scanning optical element 120c.

It is more favorable that the chromatic-aberration-correction diffractive section 120d be arranged in the path of the image light IL between the image light generator 110-1 and the light concentration optical element 120b.

In the display apparatus 10-3, a chromatic aberration of the image light IL generated by the image light generator 110-1 is corrected by the chromatic-aberration-correction diffractive section 120d, and the image light IL is diffracted (for example, reflectively diffracted) by the chromatic-aberration-correction diffractive section 120d. Then, the image light IL is incident on the reflective mirror 220a through the light concentration optical element 120b and the scanning optical element 120c.

The display apparatus 10-3 can provide effects similar to the effects provided by the display apparatus 10-2 of the second example, and enables the image light IL of which a chromatic aberration has been corrected to be incident on the eyeball EB. This results in being able to display a high-quality color image.

[Display Apparatus According to Fourth Example of First Embodiment]

A display apparatus 10-4 according to a fourth example of the first embodiment of the present technology is described with reference to FIGS. 7 and 8.

Figure 7:
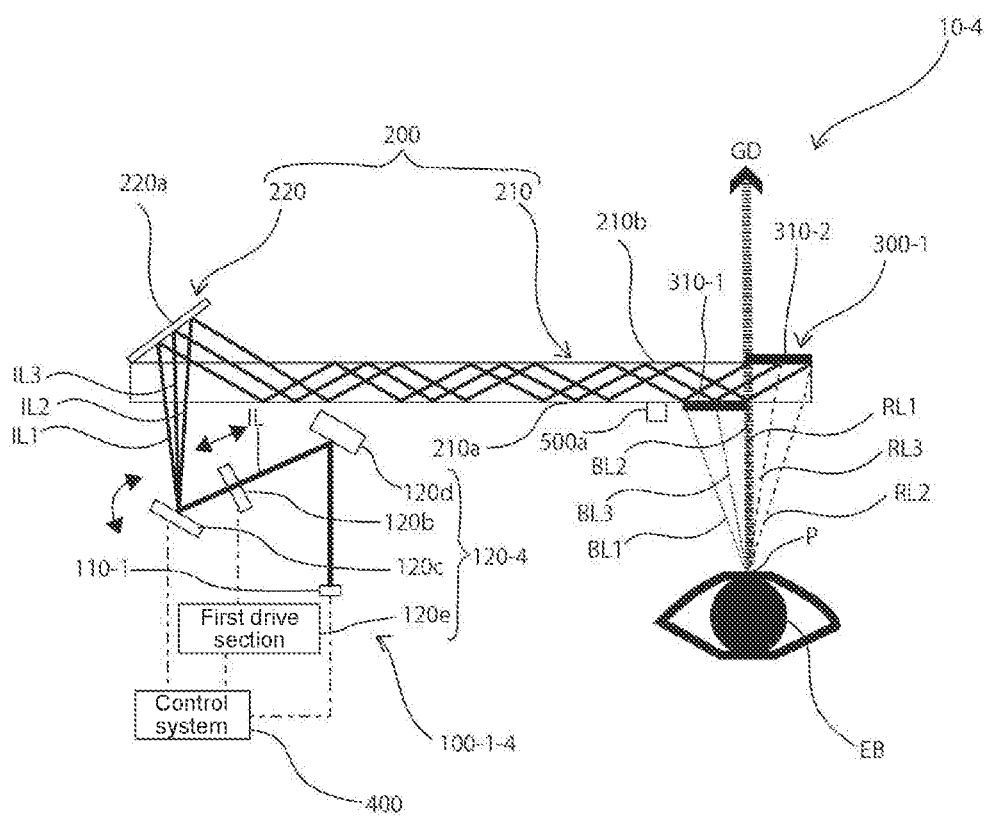
FIG. 7 illustrates a configuration of a display apparatus according to a fourth example of the first embodiment of the present technology.

In addition to the configuration of the display apparatus 10-3 of the third example, an optical system 120-4 of a light-emitting system 100-1-4 included in the display apparatus 10-4 of the fourth example includes a first drive section 120e that drives the light concentration optical element 120b in an optical-axis direction, as illustrated in FIG. 7.

Examples of the first drive section 120e include a linear motor, a combination of a rack-and-pinion mechanism and a drive source (such as a motor), and a combination of a ball-screw mechanism and a drive source (such as a motor).

Figure 8:
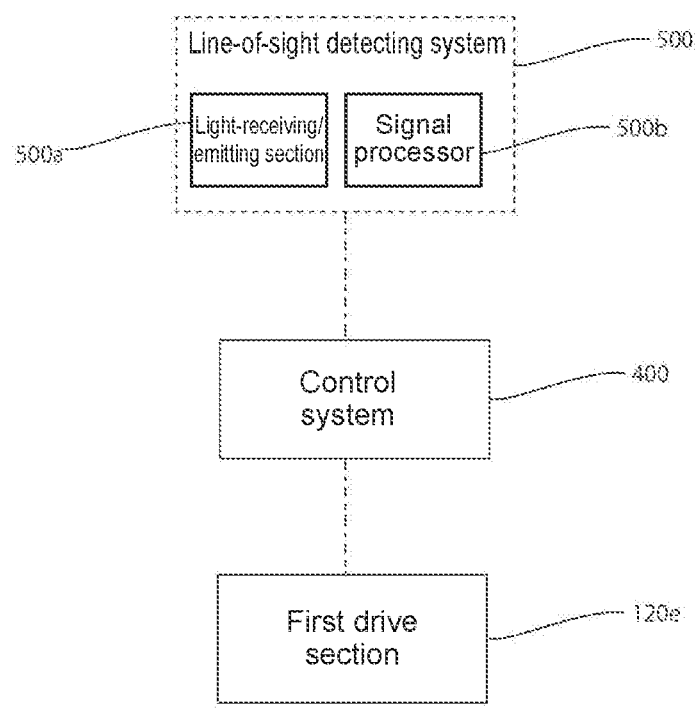
FIG. 8 is a block diagram illustrating the functionality of the display apparatus according to the fourth example of the first embodiment of the present technology.

As illustrated in FIG. 8, the display apparatus 10-4 includes a line-of-sight detecting system 500.

The line-of-sight detecting system 500 detects a line of sight that corresponds to an orientation of the eyeball EB, and outputs a result of the detection to the control system 400.

The line-of-sight detecting system 500 includes a light-receiving/emitting section 500*a* (refer to FIGS. 7 and 8) and a signal processor 500*b* (refer to FIG. 8).

The light-receiving/emitting section 500*a* includes a light-emitting element that irradiates invisible light (such as infrared light) onto the eyeball EB, and a light-receiving element (such as a quadrant photodiode (PD)) in which a plurality of (for example, four) light-receiving regions (such as PDs) is two-dimensionally arranged.

The signal processor 500*b* performs processing on output signals from the plurality of light-receiving regions of the light-receiving element, and calculates a direction of a line of sight.

The control system 400 controls the first drive section 120*e* on the basis of a result of the detection performed by the line-of-sight detecting system 500.

Specifically, the control system 400 controls the first drive section 120*e* according to a direction GD (also referred to as a gaze direction GD) of a line of sight corresponding to an orientation of the eyeball EB to adjust a position of the light concentration optical element 120*b* in the optical-axis direction.

First, the position of the light concentration optical element 120*b* such that a divergence angle and a cross-sectional shape of light (for example, blue light BL2 and red light RL1) are appropriate (favorably, optimal) is set to be a reference position, the light being diffracted by the first diffractive section 310-1 or the second diffractive section 310-2 in parallel with the gaze direction GD (such as in a direction vertical to the light guiding plate 210) to be incident on the eyeball EB when the gaze direction GD is oriented toward the center (the front), for example, as illustrated in FIG. 7.

Figure 9:
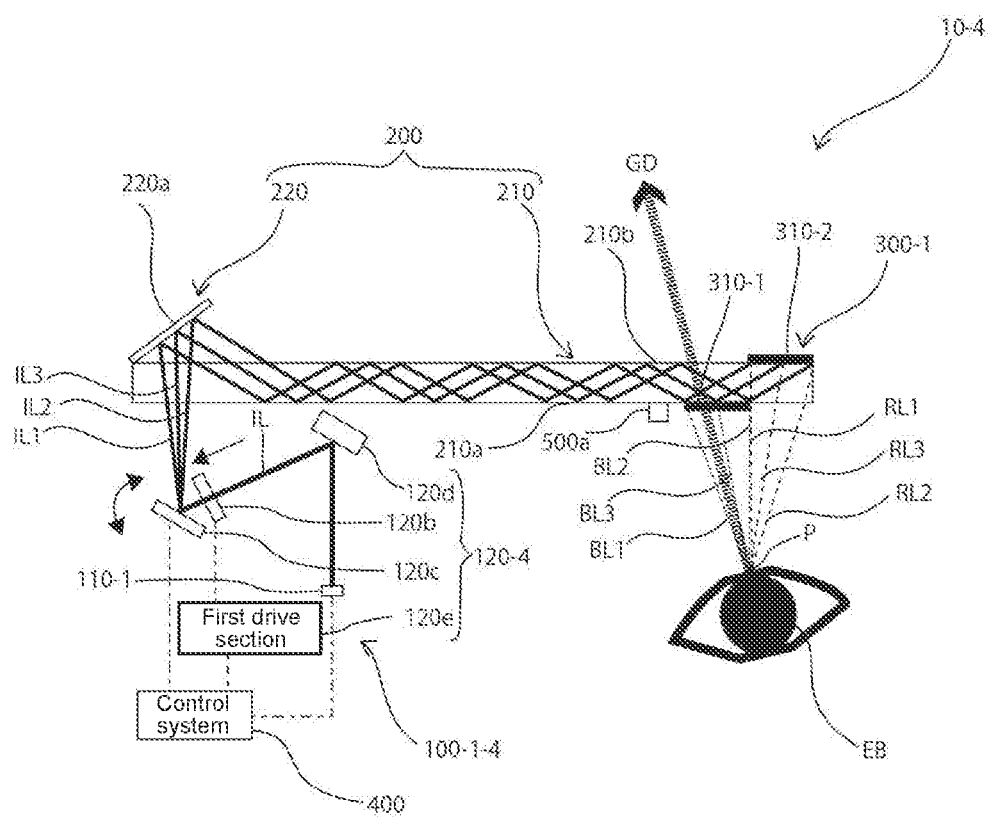
FIG. 9 illustrates an operation (a first operation) of the display apparatus according to the fourth example of the first embodiment of the present technology.

When, for example, as illustrated in FIG. 9, the gaze direction GD is oriented toward the left, the control system 400 controls the first drive section 120*e* such that the light concentration optical element 120*b* is moved from the reference position to a position situated closer to the scanning optical element 120*c*, and changes a point at which blue light BL that is incident in parallel with the gaze direction GD is concentrated by the light concentration optical element 120*b* (for example, moves the point for concentrating the blue light BL to a point further in front in the light path) such that the divergence angle and the cross-sectional shape of the blue light BL are appropriate (favorably, optimal).

Figure 10:
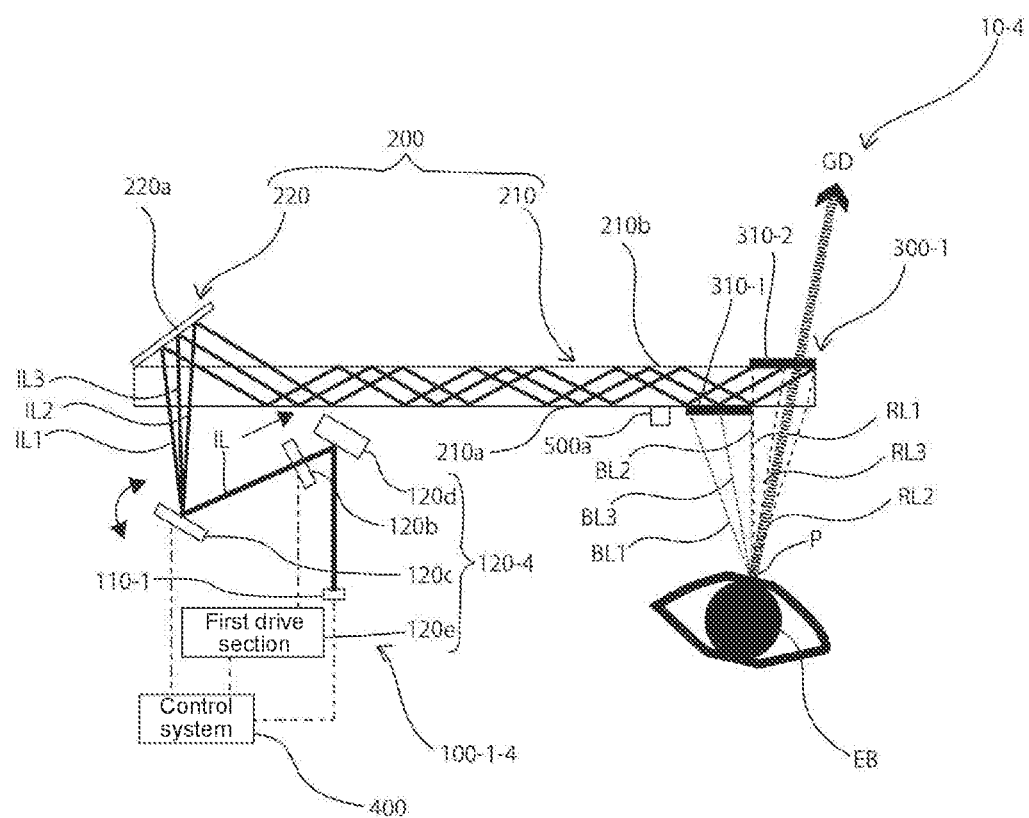
FIG. 10 illustrates an operation (a second operation) of the display apparatus according to the fourth example of the first embodiment of the present technology.

When, for example, as illustrated in FIG. 10, the gaze direction GD is oriented toward the right, the control system 400 controls the first drive section 120*e* such that the light concentration optical element 120*b* is moved from the reference position to a position situated closer to the chromatic-aberration-correction diffractive section 120*d*, and changes a point at which red light RL that is incident in parallel with the gaze direction GD is concentrated by the light concentration optical element 120*b* (for example, moves the point for concentrating the red light RL to a point further in back in the light path) such that the divergence angle and the cross-sectional shape of the red light RL are appropriate (favorably, optimal).

The display apparatus 10-4 can provide effects similar to the effects provided by the display apparatuses 10-1 to 10-3 of the first to third examples, and a divergence angle and a cross-sectional shape of light that is incident on the eyeball EB from any direction of a line of sight can be made appropriate. This results in being able to cause a high-quality image to be visually confirmed regardless of the direction of a line of sight.

2. <Display Apparatus According to Second Embodiment of Present Technology>

A display apparatus 20 according to a second embodiment of the present technology is described below with reference to the drawings.

[Configuration of Display Apparatus According to First Example of Second Embodiment]

A configuration of a display apparatus 20-1 according to a first example of the second embodiment of the present technology is described with reference to FIGS. 11 and 12.

Figure 11:
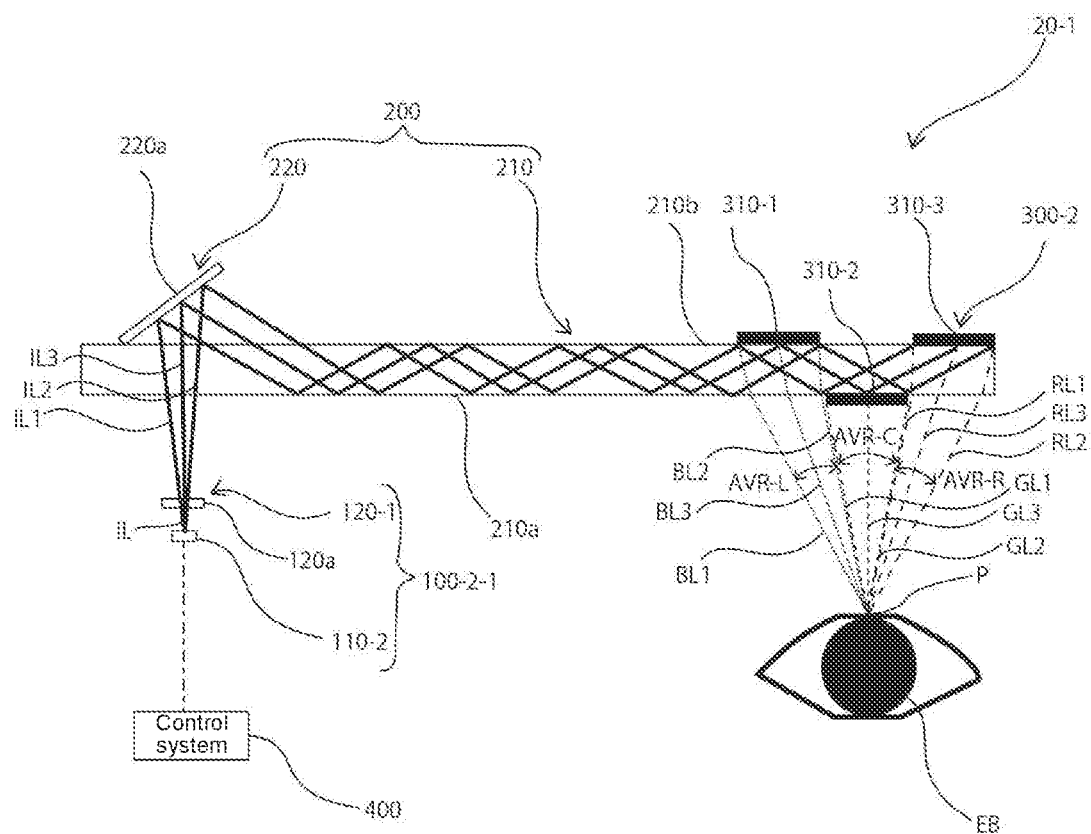
FIG. 11 illustrates a configuration of a display apparatus according to a first example of a second embodiment of the present technology.
Figure 12:
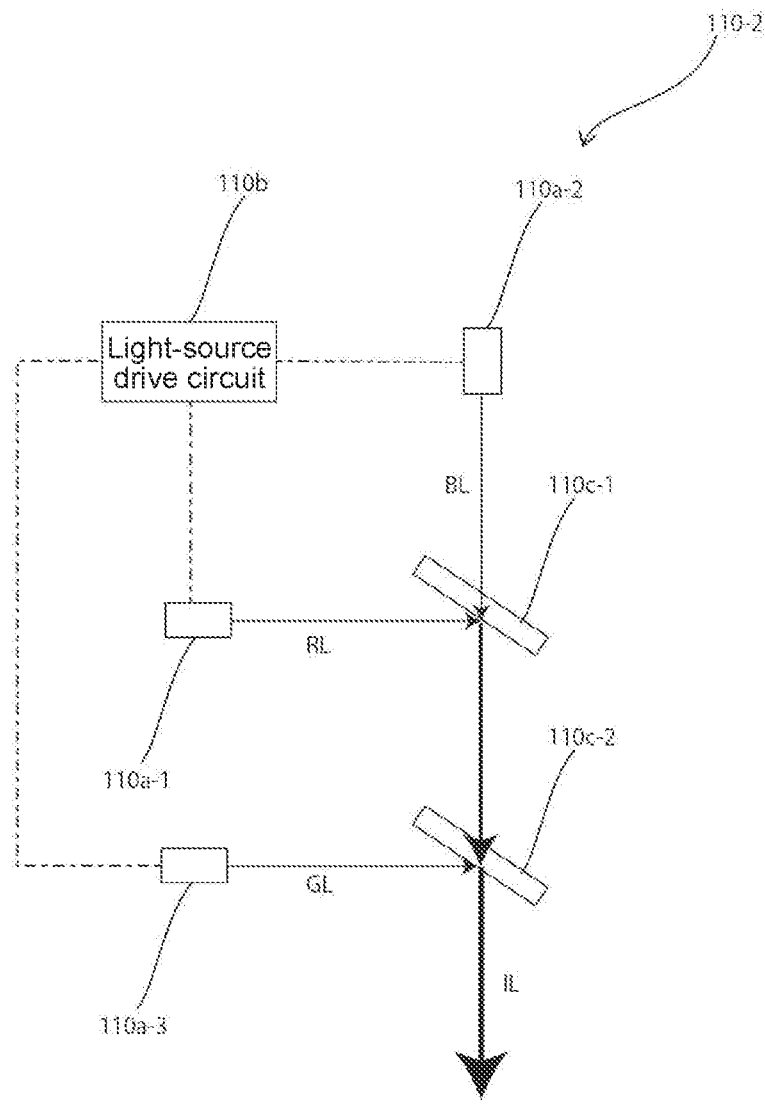
FIG. 12 illustrates a configuration of an image light generator of the display apparatus according to the first example of the second embodiment of the present technology.

As illustrated in FIGS. 11 and 12, the display apparatus 20-1 according to the first example of the second embodiment has a configuration similar to the configuration of the display apparatus 10-1 according to the first example of the first embodiment except for the configuration of an image light generator of a light-emitting system and the configuration of a light deflecting system.

As illustrated in FIG. 12, an image light generator 110-2 of a light-emitting system 100-2-1 included in the display apparatus 20-1 of the first example includes the first light source 110*a*-1, the second light source 110*a*-2, a third light source 110*a*-3, and first and second light-combining elements 110*c*-1 and 110*c*-2.

The third light source 110*a*-3 emits green light GL. For example, the first light-combining element 110*c*-1 is a dichroic mirror that is provided at an intersection of a path of red light RL from the first light source 110*a*-1 and a path of blue light BL from the second light source 110*a*-2. The red light RL from the first light source 110*a*-1 is reflected off the first light-combining element 110*c*-1, and the blue light BL from the second light source 110*a*-2 is transmitted through the first light-combining element 110*c*-1. Then, the first light-combining element 110*c*-1 emits combining light obtained by combining the red light RL and the blue light BL.

For example, the second light-combining element 110*c*-2 is a dichroic mirror that is provided at an intersection of a path of the green light GL from the third light source 110*a*-3 and a path of the combining light from the first light-combining element 110*c*-1. The green light GL from the third light source 110*a*-3 is reflected off the second light-combining element 110*c*-2, and the combining light coming from the second light-combining element 110*c*-2 and being obtained by combining the red light RL and the blue light BL is transmitted through the second light-combining element 110*c*-2.

In other words, the second light-combining element 110*c*-2 emits combining light obtained by combining the red light RL, the green light GL, and the blue light BL. The combining light emitted by the second light-combining element 110*c*-2 is image light IL generated by the image light generator 110*c*-2.

As illustrated in FIG. 11, a light deflecting system 300-2 included in the display apparatus 20-1 of the first example includes the first diffractive section 310-1, the second diffractive section 310-2, and a third diffractive section 310-3.

The first, second, and third diffractive sections 310-1, 310-2, and 310-3 are arranged in this order from the upstream to the downstream of a propagation route of the image light IL.

Specifically, between the left end surface and a right end surface of the light guiding plate 210, the first, second, and third diffractive sections 310-1, 310-2, and 310-3 are provided alternately to the surface 210*b* in back and the surface 210*a* in front being included in the light guiding plate 210, such that at least a portion of one of the diffractive sections does not face at least a portion of another of the diffractive sections.

For example, the first diffractive section 310-1 is provided to the surface 210*b* in back being included in the light guiding plate 210, and selectively reflectively diffracts the blue light BL from among entering light.

For example, the second diffractive section 310-2 is provided to the surface 210*a* in front being included in the light guiding plate 210, and selectively transmissively diffracts the green light GL from among the entering light.

For example, the third diffractive section 310-3 is provided to the surface 210*b* in back being included in the light guiding plate 210, and selectively reflectively diffracts the red light RL from among the entering light.

[Operation Performed by Display Apparatus According to First Example of Second Embodiment]

An operation performed by the display apparatus 20-1 of the first example is described below.

First, an operation common to the respective pieces of image light IL is described.

In the display apparatus 20-1, the respective pieces of image light IL emitted by the light-emitting system 100-2-1 are reflected off the reflective mirror 220*a* to enter the light guiding plate 210. The image light IL entering the light guiding plate 210 propagates through the light guiding plate 210 while being totally reflected within the light guiding plate 210, and is incident on the first diffractive section 310-1. Blue light BL from among the image light IL incident on the first diffractive section 310-1 is reflectively diffracted by the first diffractive section 310-1, and then is refracted by the surface 210*a* in front being included in the light guiding plate 210 to be incident on the position P on the eyeball EB. Green light GL and red light RL from among the image light IL incident on the first diffractive section 310-1 are totally reflected at the side of the surface 210*b* in back being included in the light guiding plate 210 to be incident on the second diffractive section 310-2. The green light GL incident on the second diffractive section 310-2 is transmissively diffracted by the second diffractive section 310-2 to be headed for the position P on the eyeball EB. The red light RL incident on the second diffractive section 310-2 is totally reflected at the side of the surface 210*a* in front being included in the light guiding plate 210 to be incident on the third diffractive section 310-3. The red light RL incident on the third diffractive section 310-2 is reflectively diffracted by the third diffractive section 310-3, and then is refracted by the surface 210*a* in front being included in the light guiding plate 210 to be incident on the position P on the eyeball EB.

As described above, blue light BL, green light GL, and red light RL included in each piece of image light IL are incident on one position P on the eyeball EB from different directions. This results in being able to cause a user to visually confirm a color image (such as a full-color image) made up of combining light obtained by combining the blue light BL, the green light GL, and the red light RL.

Next, operations respectively performed with respect to first to third pieces of image light IL1 to IL3 are described.

Blue light BL1 from among the first image light IL1 incident on the left end portion of the first diffractive section 310-1 is reflectively diffracted by the left end portion of the first diffractive section 310-1 such that the blue light BL1 forms a left end of a left angle-of-view range AVR-L (a maximum angle of view on the left of all of the angle-of-view ranges). Thereafter, the blue light BL1 is refracted by the surface 210*a* in front being included in the light guiding plate 210, and is incident on the position P on the eyeball EB.

Blue light BL3 from among the third image light IL3 incident on an intermediate portion of the first diffractive section 310-1 is reflectively diffracted by the intermediate portion of the first diffractive section 310-1 such that the blue light BL3 forms the center of the left angle-of-view range AVR-L. Thereafter, the blue light BL3 is refracted by the surface 210*a* in front being included in the light guiding plate 210, and is incident on the position P on the eyeball EB.

Blue light BL2 from among the second image light IL2 incident on a right end portion of the first diffractive section 310-1 is reflectively diffracted by the right end portion of the first diffractive section 310-1 such that the blue light BL2 forms a right end of the left angle-of-view range AVR-L. Thereafter, the blue light BL2 is refracted by the surface 210*a* in front being included in the light guiding plate 210, and is incident on the position P on the eyeball EB.

Green light GL1 incident on a left end portion of the second diffractive section 310-2 is transmissively diffracted by the left end portion of the second diffractive section 310-2 such that the green light GL1 forms a left end of a central angle-of-view range AVR-C, and the green light GL1 is incident on the position P on the eyeball EB.

Green light GL3 incident on an intermediate portion of the second diffractive section 310-2 is transmissively diffracted by the intermediate portion of the second diffractive section 310-2 such that the green light GL3 forms the center of the central angle-of-view range AVR-C (an angle-of-view center in all of the angle-of-view ranges), and the green light GL3 is incident on the position P on the eyeball EB.

Green light GL2 incident on a right end portion of the second diffractive section 310-2 is transmissively diffracted by the right end portion of the second diffractive section 310-2 such that the green light GL2 forms a right end of the central angle-of-view range AVR-C, and the green light GL2 is incident on the position P on the eyeball EB.

Red light RL1 incident on a left end portion of the third diffractive section 310-3 is reflectively diffracted by the left end portion of the third diffractive section 310-3 such that the red light RL1 forms a left end of a right angle-of-view range AVR-R. Thereafter, the red light RL1 is refracted by the surface 210*a* in front being included in the light guiding plate 210, and is incident on the position P on the eyeball EB.

Red light RL3 incident on an intermediate portion of the third diffractive section 310-3 is reflectively diffracted by the intermediate portion of the third diffractive section 310-3 such that the red light RL3 forms the center of the right angle-of-view range AVR-R. Thereafter, the red light RL3 is refracted by the surface 210*a* in front being included in the light guiding plate 210, and is incident on the position P on the eyeball EB.

Red light RL2 incident on a right end portion of the third diffractive section 310-3 is reflectively diffracted by the right end portion of the third diffractive section 310-3 such that the red light RL2 forms a right end of the right angle-of-view range AVR-R (the maximum angle of view on the right of all of the angle-of-view ranges). Thereafter, the red light RL2 is refracted by the surface 210*a* in front being included in the light guiding plate 210, and is incident on the position P on the eyeball EB.

[Effects Provided by Display Apparatus According to First Example of Second Embodiment]

In the display apparatus 20-1 of the first example, the light-emitting system 100-2-1 emits image light IL that includes combining light obtained by combining three pieces of light (such as blue light BL, green light GL, and red light RL), and the light deflecting system 300-2 includes a diffractive section group including the three diffractive sections 310-1 to 310-3 and successively selectively diffracting three pieces of light (such as blue light BL, green light GL, and red light RL) included in the image light IL. Further, the light-emitting system 100-2-1 emits a plurality of pieces of image light IL including the first to third pieces of image light IL1 to IL3.

The display apparatus 20-1 can provide effects similar to the effects provided by the display apparatus 10-1 according to the first example of the first embodiment, and can display, at a wider angle of view and at a high resolution, a color image (such as a full-color image) made up of combining light obtained by combining three pieces of light (such as blue light BL, green light GL, and red light RL).

[Display Apparatus According to Second Example of Second Embodiment]

A display apparatus 20-2 according to a second example of the second embodiment of the present technology is described with reference to FIG. 13.

Figure 13:
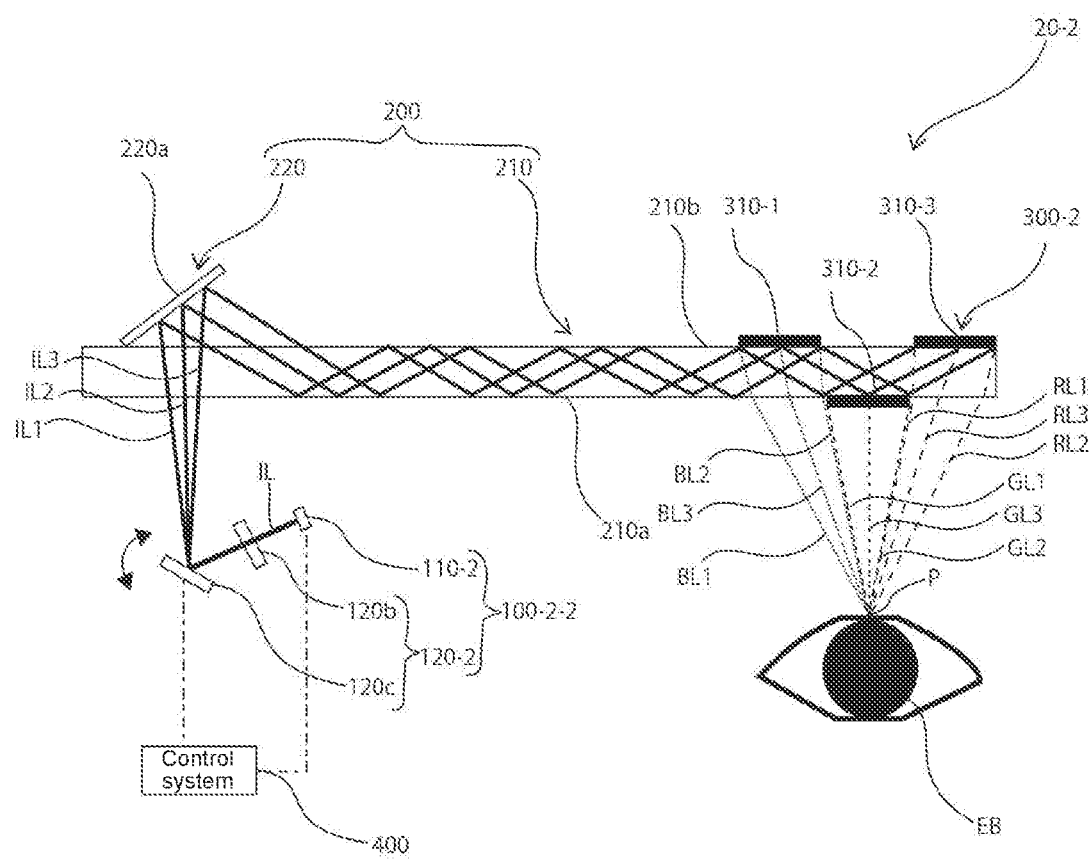
FIG. 13 illustrates a configuration of a display apparatus according to a second example of the second embodiment of the present technology.

As illustrated in FIG. 13, the display apparatus 20-2 of the second example has a configuration similar to the configuration of the display apparatus 20-1 of the first example except for the configuration of a light-emitting system.

A light-emitting system 100-2-2 of the display apparatus 20-2 has a configuration similar to the configuration of the light-emitting system 100-1-2 of the display apparatus 10-2 according to the second example of the first embodiment except for the configuration of an image light generator.

In other words, the light-emitting system 100-2-2 has the configuration of the light-emitting system 100-1-2 in which the image light generator 110-1 has been replaced with the image light generator 110-2.

The display apparatus 20-2 can provide effects similar to the effects provided by the display apparatus 20-1 of the first example, and makes it possible to control respective pieces of scanning light (respective pieces of image light IL) individually.

[Display Apparatus According to Third Example of Second Embodiment]

A display apparatus 20-3 according to a third example of the second embodiment of the present technology is described with reference to FIG. 14.

Figure 14:
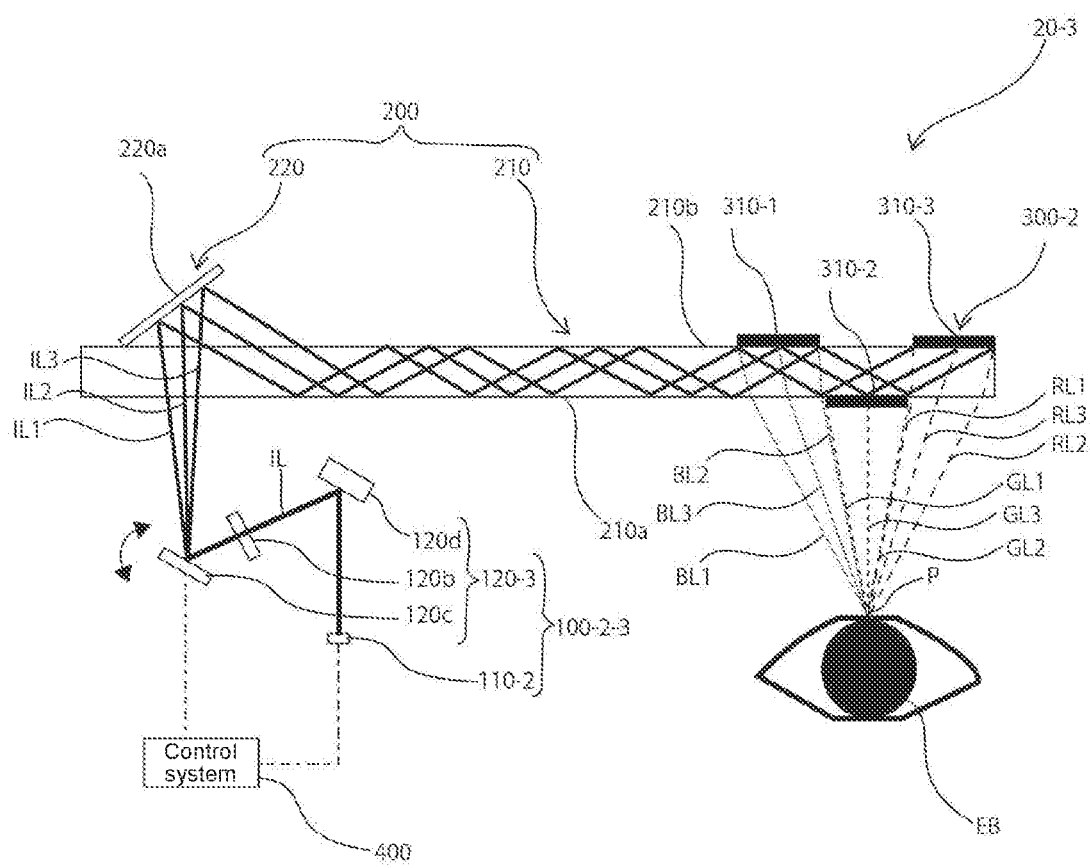
FIG. 14 illustrates a configuration of a display apparatus according to a third example of the second embodiment of the present technology.

As illustrated in FIG. 14, the display apparatus 20-3 of the third example has a configuration similar to the configuration of the display apparatus 20-2 of the second example except for the configuration of a light-emitting system.

A light-emitting system 100-2-3 of the display apparatus 20-3 has a configuration similar to the configuration of the light-emitting system 100-1-3 of the display apparatus 10-3 according to the third example of the first embodiment except for the configuration of an image light generator.

In other words, the light-emitting system 100-2-3 has the configuration of the light-emitting system 100-1-3 in which the image light generator 110-1 has been replaced with the image light generator 110-2.

The display apparatus 20-3 can provide effects similar to the effects provided by the display apparatus 20-2 of the second example, and can display a high-quality color image in which a chromatic aberration has been corrected.

[Display Apparatus According to Fourth Example of Second Embodiment]

A display apparatus 20-4 according to a fourth example of the second embodiment of the present technology is described with reference to FIGS. 15 to 17.

Figure 15:
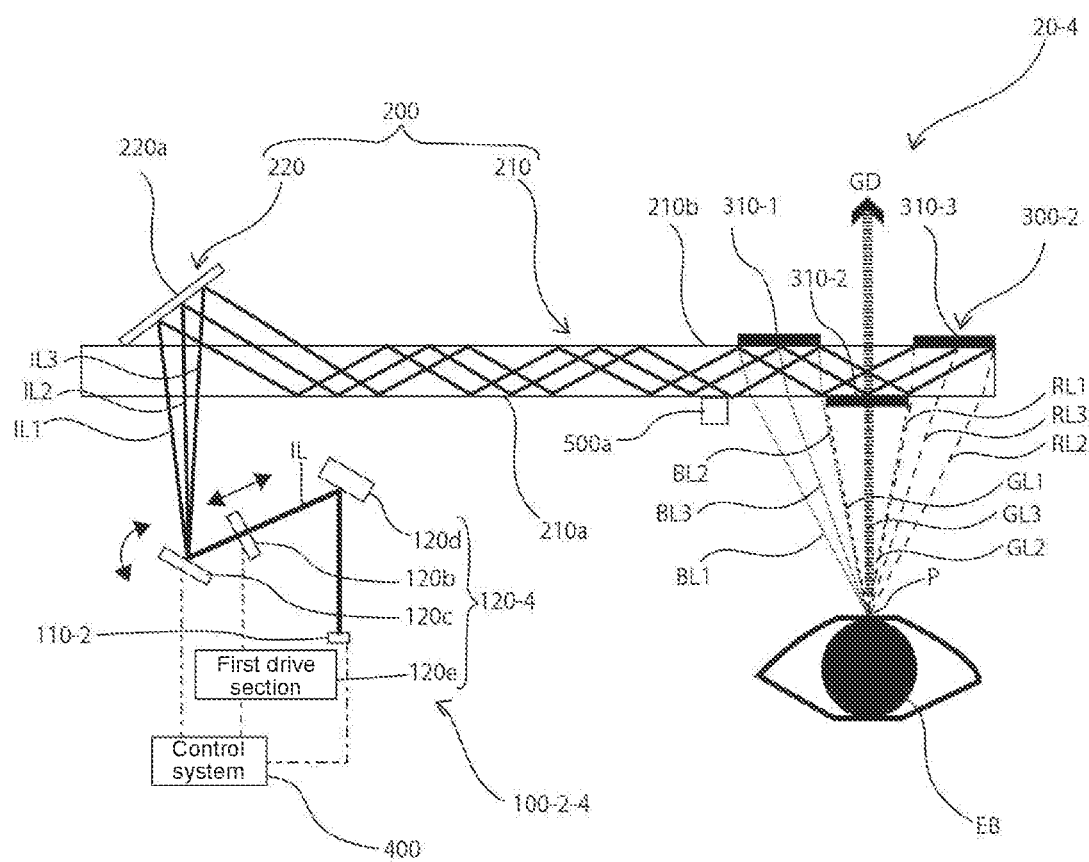
FIG. 15 illustrates a configuration of a display apparatus according to a fourth example of the second embodiment of the present technology.

As illustrated in FIG. 15, the display apparatus 20-4 of the fourth example includes a light-emitting system that has a configuration different from the configuration of the light-emitting system of the display apparatus 20-1 of the first example.

Further, the display apparatus 20-4 includes the line-of-sight detecting system 500 (refer to FIG. 8) and the first drive section 120e.

A light-emitting system 100-2-4 of the display apparatus 20-4 has a configuration similar to the configuration of the light-emitting system 100-1-4 of the display apparatus 10-4 according to the fourth example of the first embodiment except for the configuration of an image light generator.

In other words, the light-emitting system 100-2-4 has the configuration of the light-emitting system 100-1-4 in which the image light generator 110-1 has been replaced with the image light generator 110-2.

The control system 400 controls the first drive section 120e on the basis of a result of detection performed by the line-of-sight detecting system 500.

Specifically, the control system 400 controls the first drive section 120e according to a direction GD (also referred to as a gaze direction GD) of a line of sight corresponding to an orientation of the eyeball EB to adjust a position of the light concentration optical element 120b in the optical-axis direction.

First, the position of the light concentration optical element 120b such that a divergence angle and a cross-sectional shape of light (for example, green light GL3) are appropriate (favorably, optimal) is set to be a reference position, the light being diffracted by the first diffractive section 310-1 or the second diffractive section 310-2 in parallel with the gaze direction GD (such as in a direction vertical to the light guiding plate 210) to be incident on the eyeball EB when the gaze direction GD is oriented toward the center (the front), for example, as illustrated in FIG. 15.

Figure 16:
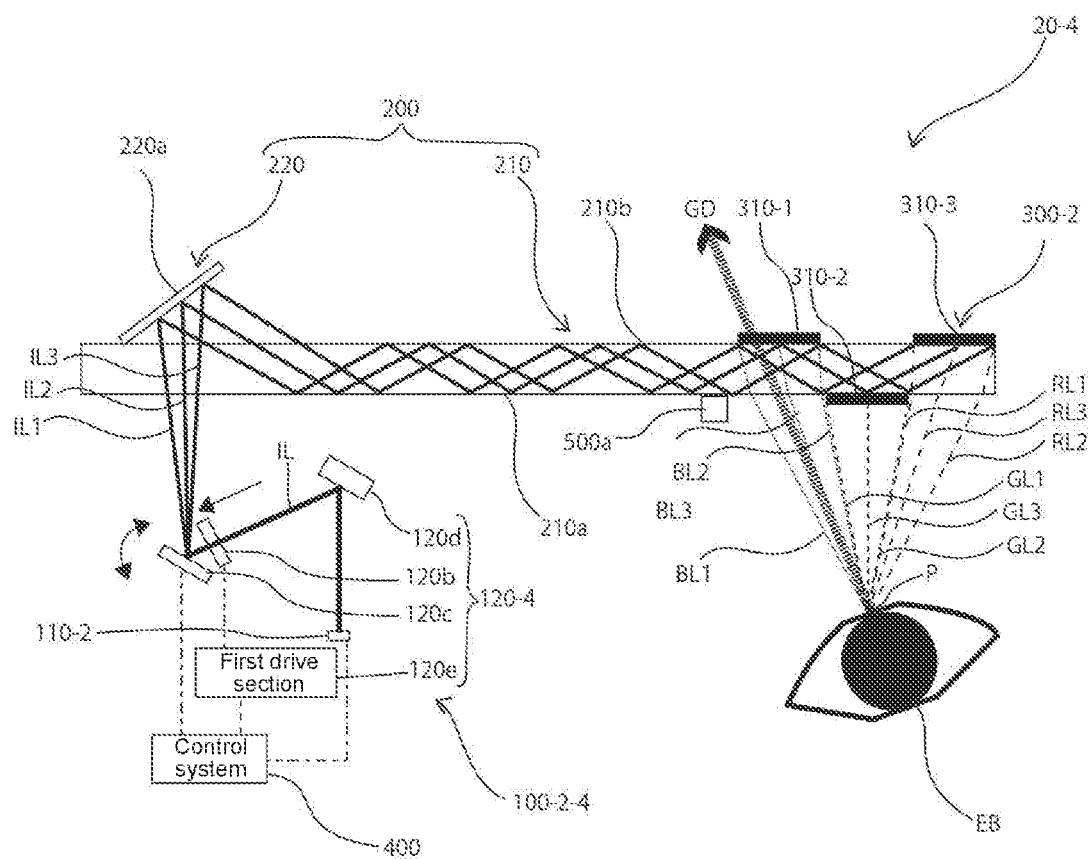
FIG. 16 illustrates an operation (a first operation) of the display apparatus according to the fourth example of the second embodiment of the present technology.

When, for example, as illustrated in FIG. 16, the gaze direction GD is oriented toward the left, the control system 400 controls the first drive section 120e such that the light concentration optical element 120b is moved from the reference position to a position situated closer to the scanning optical element 120c, and changes a point at which blue light BL that is incident on the eyeball EB from the first diffractive section 310-1 in parallel with the gaze direction GD is concentrated by the light concentration optical element 120b (for example, moves the point for concentrating the blue light BL to a point further in front in the light path) such that the divergence angle and the cross-sectional shape of the blue light BL are appropriate (favorably, optimal).

Figure 17:
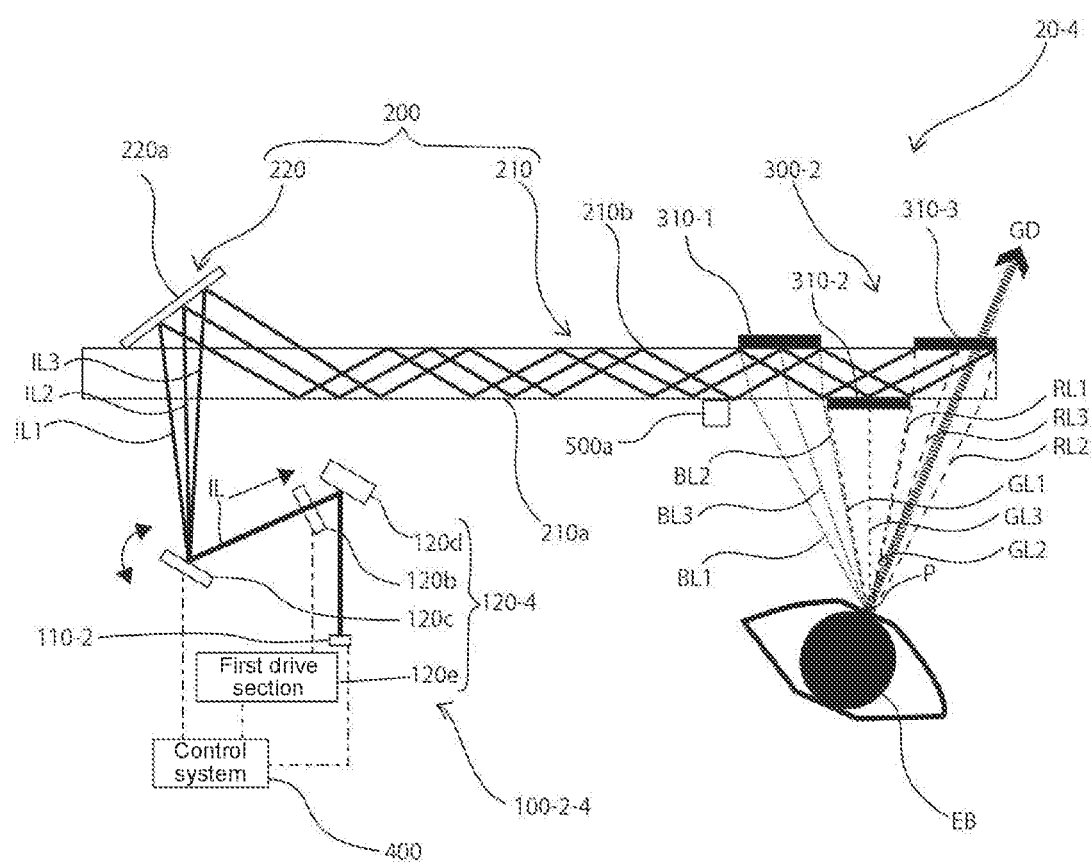
FIG. 17 illustrates an operation (a second operation) of the display apparatus according to the fourth example of the second embodiment of the present technology.

When, for example, as illustrated in FIG. 17, the gaze direction GD is oriented toward the right, the control system 400 controls the first drive section 120e such that the light concentration optical element 120b is moved from the reference position to a position situated closer to the chromatic-aberration-correction diffractive section 120d, and changes a point at which red light RL that is incident on the eyeball EB in parallel with the gaze direction GD is concentrated by the light concentration optical element 120b (for example, moves the point for concentrating the red light RL to a point further in back in the light path) such that the divergence angle and the cross-sectional shape of the red light RL are appropriate (favorably, optimal).

The display apparatus 20-4 can provide effects similar to the effects provided by the display apparatus 20-3 of the third example, and a divergence angle and a cross-sectional shape of light that is incident on the eyeball EB from any direction of a line of sight can be made appropriate. This results in being able to cause a high-quality image to be visually confirmed regardless of the direction of a line of sight.

3. <Display Apparatus According to Third Embodiment of Present Technology>

A display apparatus 30 according to a third embodiment of the present technology is described below with reference to the drawings.

[Display Apparatus According to First Example of Third Embodiment of Present Technology]

A display apparatus 30-1 according to a first example of the third embodiment is described with reference to FIG. 18.

Figure 18:
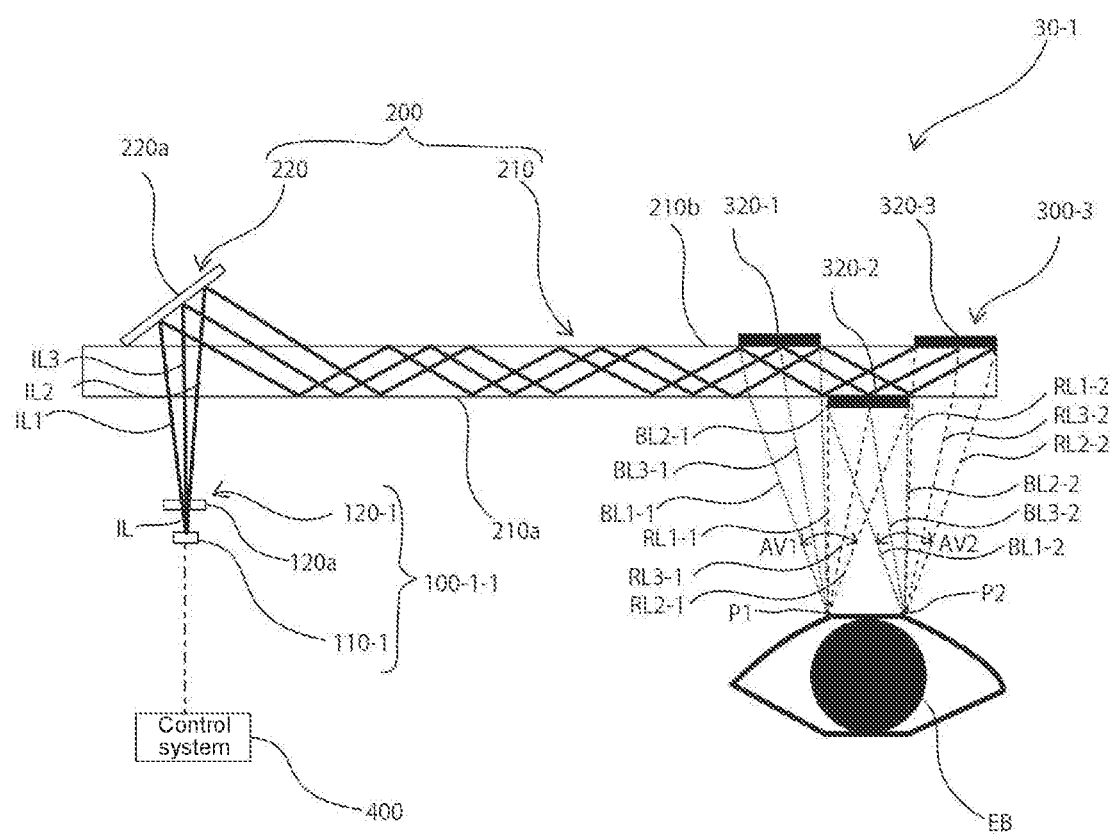
FIG. 18 illustrates a configuration of a display apparatus according to a first example of a third embodiment of the present technology.

As illustrated in FIG. 18, the display apparatus 30-1 according to the first example of the third embodiment has a configuration similar to the configuration of the display apparatus 10-1 according to the first example of the first embodiment except for the configuration of a light deflecting system.

A diffractive section group included in the display apparatus 30-1 of the first example diffracts at least two of the plurality of pieces of light included in the image light IL such that the at least two of the plurality of pieces of light included in the image light IL are headed for different positions on the eyeball EB.

The diffractive section group included in the display apparatus 30-1 of the first example diffracts at least two of the plurality of pieces of light included in the image light IL such that the at least two of the plurality of pieces of light included in the image light IL are headed for one position on the eyeball EB.

Specifically, the light deflecting system 300-3 of the display apparatus 30-1 includes a diffractive section group that includes first to third diffractive sections 320-1 to 320-3 that are provided in this order on a propagation route of the image light IL in the light guiding plate 210.

The first and third diffractive sections 320-1 and 320-3 are provided to, for example, the surface 210b in back being included in the light guiding plate 210, and the second diffractive section 320-2 is provided to, for example, the surface 210a in front being included in the light guiding plate 210.

The first diffractive section 320-1 selectively diffracts a portion of blue light BL included in the image light IL. The diffracted portion of the blue light BL is refracted by the surface 210a in front being included in the light guiding plate 210 to be incident on a position P1 situated in a left portion of the eyeball EB. Another portion of the blue light BL and red light RL from among the image light IL are totally reflected at the side of the surface 210b in back being included in the light guiding plate 210 to be incident on the second diffractive section 320-2.

The second diffractive section 320-2 includes a plurality of (for example, two) diffractive structures arranged in a layered formation in a thickness direction of the light guiding plate 210. The diffractive structures of the plurality of diffractive structures have wavelength selective properties with respect to different wavelengths (for example, wavelengths of the blue light BL and the red light RL) from among wavelengths of a plurality of pieces of light included in the image light IL.

One of the plurality of (for example, two) diffractive structures of the second diffractive section 320-2 diffracts a portion of the incident red light RL to be headed for the position P1 situated in the left portion of the eyeball EB, and another of the plurality of diffractive structures of the second diffractive section 320-2 diffracts the incident other portion of the blue light BL to be headed for a position P2 that is situated in a right portion of the eyeball EB. Another portion of the red light RL incident on the second diffractive section 320-2 is totally reflected at the side of the surface 210a in front being included in the light guiding plate 210, and is incident on the third diffractive section 320-3.

The third diffractive section 320-3 selectively diffracts the incident other portion of the red light RL. The diffracted other portion of the red light RL is refracted by the surface 210a in front being included in the light guiding plate 210, and is incident on the position P2 in the right portion of the eyeball EB.

The first and second diffractive sections 320-1 and 320-2 have wavelength selective properties with respect to different wavelengths (for example, the wavelengths of the blue light BL and the red light RL) from among the wavelengths of the plurality of pieces of light included in the image light IL.

The first and second diffractive sections 320-1 and 320-2 have wavelength selective properties with respect to the same wavelength (for example, the wavelength of the blue light BL) from among the wavelengths of the plurality of pieces of light included in the image light IL.

The second and third diffractive sections 320-2 and 320-3 have wavelength selective properties with respect to different wavelengths (for example, the wavelengths of the blue light BL and the red light RL) from among the wavelengths of the plurality of pieces of light included in the image light IL.

The second and third diffractive sections 320-2 and 320-3 have wavelength selective properties with respect to the same wavelength (for example, the wavelength of the red light RL) from among the wavelengths of the plurality of pieces of light included in the image light IL.

As described above, in the display apparatus 30-1, a portion of blue light BL from among image light IL incident on the diffractive section group of the light deflecting system 300-3, and a portion of red light RL from among the image light IL are incident on the position P1 on the eyeball EB, and another portion of the blue light BL and another portion of the red light RL are incident on the position P2 on the eyeball EB.

In other words, a plurality of pieces of light diffracted by the first and second diffractive sections 320-1 and 320-2 forms a first angle of view AV1, with the position P1 situated in the left portion being a light concentration point (an apex), and a plurality of pieces of light diffracted by the second and third diffractive sections 320-2 and 320-3 forms a second angle of view AV2, with the position P2 situated in the right portion being a light concentration point (an apex).

This also makes it possible to cause a color image made up of combining light obtained by combining blue light BL and red light RL to be visually confirmed if, for example, there is some amount of deviation of the display apparatus 30-1 from the eyeball EB. In other words, loss of a color image can be suppressed.

Supplementarily, a portion BL1-1 of blue light BL1 from among image light IL1 incident on a left end portion of the first diffractive section 320-1 is reflectively diffracted by the left end portion of the first diffractive section 320-1 such that the portion BL1-1 forms a maximum angle of view on the left of the first angle of view AV1. Thereafter, the portion BL1-1 is refracted by the surface 210a in front being included in the light guiding plate 210, and is incident on the position P1 situated in the left portion of the eyeball EB.

Another portion BL1-2 of the blue light BL and red light RL1 from among the image light IL1 incident on the left end portion of the first diffractive section 320-1 are totally reflected at the side of the surface 210*b* in back being included in the light guiding plate 210 to be incident on a left end portion of the second diffractive section 320-2.

A portion BL2-1 of blue light BL2 from among image light IL2 incident on a right end portion of the first diffractive section 320-1 is reflectively diffracted by the right end portion of the first diffractive section 320-1 such that the portion BL2-1 forms an angle-of-view center in the first angle of view AV1, and the portion BL2-1 is incident on the position P1 situated in the left portion of the eyeball EB.

Another portion BL2-2 of the blue light BL and red light RL2 from among the image light IL2 incident on a right end portion of the first diffractive section 320-1 are totally reflected at the side of the surface 210*b* in back being included in the light guiding plate 210, and is incident on a right end portion of the second diffractive section 320-2.

A portion BL3-1 of blue light BL3 from among image light IL3 incident on a portion intermediate between the left end portion and the right end portion of the first diffractive section 320-1, is reflectively diffracted by the intermediate portion such that the portion BL3-1 forms an intermediate angle of view in the first angle of view AV1, where the portion BL3-1 corresponds to a line intermediate between a line forming the maximum angle of view on the left and a line forming the angle-of-view center in the first angle of view AV1. Thereafter, the portion BL3-1 is refracted by the surface 210*a* in front being included in the light guiding plate 210, and is incident on the position P1 situated in the left portion of the eyeball EB.

Another portion BL3-2 of the blue light BL3 and red light RL3 from among the image light IL3 incident on the portion intermediate between the left end portion and the right end portion of the first diffractive section 320-1, is totally reflected at the side of the surface 210*b* in back being included in the light guiding plate 210, and is incident on a portion intermediate between the left end portion and the right end portion of the second diffractive section 320-2.

A portion RL1-1 of the red light RL1 incident on the left end portion of the second diffractive section 320-2 is transmissively diffracted by the left end portion of the second diffractive section 320-2 such that the portion RL1-1 forms the angle-of-view center in the first angle of view AV1, and the portion RL1-1 is incident on the position P1 situated in the left portion of the eyeball EB.

Another portion RL1-2 of the red light RL1 incident on the left end portion of the second diffractive section 320-2 is totally reflected at the side of the surface 210*a* in front being included in the light guiding plate 210, and is incident on the third diffractive section 320-3.

The other portion BL1-2 of the blue light BL1, which is incident on the left end portion of the second diffractive section 320-2 is transmissively diffracted by the left end portion of the second diffractive section 320-2 such that the other portion BL1-2 forms a left end of the second angle of view AV2, and the other portion BL1-2 is incident on the position P2 situated in the right portion of the eyeball EB.

A portion RL2-1 of the red light RL2 incident on the right end portion of the second diffractive section 320-2 is transmissively diffracted by the right end portion of the second diffractive section 320-2 such that the portion RL2-1 forms a right end of the first angle of view AV1, and the portion RL2-1 is incident on the position P1 situated in the left portion of the eyeball EB.

Another portion RL2-2 of the red light RL2 incident on the right end portion of the second diffractive section 320-2 is totally reflected at the side of the surface 210*a* in front being included in the light guiding plate 210, and the other portion RL2-2 is incident on the third diffractive section 320-3.

The other portion BL2-2 of the blue light BL2, which is incident on the right end portion of the second diffractive section 320-2 is transmissively diffracted by the right end portion of the second diffractive section 320-2 such that the other portion BL2-2 forms an angle-of-view center in the second angle of view AV2, and the other portion BL2-2 is incident on the position P2 situated in the right portion of the eyeball EB.

A portion RL3-1 of the red light RL3 incident on the portion intermediate between the left end portion and the right end portion of the second diffractive section 320-2 is transmissively diffracted by the intermediate portion such that the portion RL3-1 forms the intermediate angle of view in the first angle of view AV1, where the portion RL3-1 corresponds to a line intermediate between the line forming the angle-of-view center and a line forming the maximum angle of view on the right in the first angle of view AV1, and the portion RL3-1 is incident on the position P1 situated in the left portion of the eyeball EB.

Another portion RL3-2 of the red light RL3 incident on the portion intermediate between the left end portion and the right end portion of the second diffractive section 320-2 is totally reflected at the side of the surface 210*a* in front being included in the light guiding plate 210, and is incident on the third diffractive section 320-3.

The other portion BL3-2 of the blue light BL3, which is incident on the portion intermediate between the left end portion and the right end portion of the second diffractive section 320-2 is transmissively diffracted by the intermediate portion such that the portion BL3-2 forms an intermediate angle of view in the second angle of view AV2, where the portion BL3-2 corresponds to a line intermediate between a line forming the angle-of-view center and a line forming a maximum angle of view on the left in the second angle of view AV2, and the portion BL3-2 is incident on the position P2 situated in the right portion of the eyeball EB.

The other portion RL1-2 of the red light RL1, which is incident on the left end portion of the third diffractive section 320-3 is reflectively diffracted by the left end portion of the third diffractive section 320-3 such that the other portion RL1-2 forms the angle-of-view center in the second angle of view AV2, and the other portion RL1-2 is incident on the position P2 situated in the right portion of the eyeball EB.

The other portion RL2-2 of the red light RL2, which is incident on a right end portion of the third diffractive section 320-3 is reflectively diffracted by the right end portion of the third diffractive section 320-3 such that the other portion RL2-2 forms the maximum angle of view on the right of the second angle of view AV2. Thereafter, the other portion RL2-2 is refracted by the surface 210*a* in front being included in the light guiding plate 210, and is incident on the position P2 situated in the right portion of the eyeball EB.

The other portion RL3-2 of the red light RL3, which is incident on a portion intermediate between the left end portion and the right end portion of the third diffractive section 320-3 is reflectively diffracted by the intermediate portion such that the other portion RL3-2 forms the intermediate angle of view in the second angle of view AV2, where the other portion RL3-2 corresponds to a line intermediate between the line forming the angle-of-view center and a line forming the maximum angle of view on the right in the second angle of view AV2. Thereafter, the other portion RL3-2 is refracted by the surface 210a in front being included in the light guiding plate 210, and is incident on the position P2 situated in the right portion of the eyeball EB.

Note that the second diffractive section 320-2 has a layered-formation structure that includes a plurality of (for example, two) diffractive structures arranged in a layered formation. However, the second diffractive section 320-2 may have a single structure in which a plurality of (for example, two) diffraction patterns is formed. In this case, it is favorable that the diffraction patterns of the plurality of diffraction patterns have wavelength selective properties with respect to different wavelengths from among wavelengths of a plurality of pieces of light included in the image light IL.

[Display Apparatus According to Second Example of Third Embodiment of Present Technology]

A display apparatus 30-2 according to a second example of the third embodiment is described with reference to FIG. 19.

Figure 19:
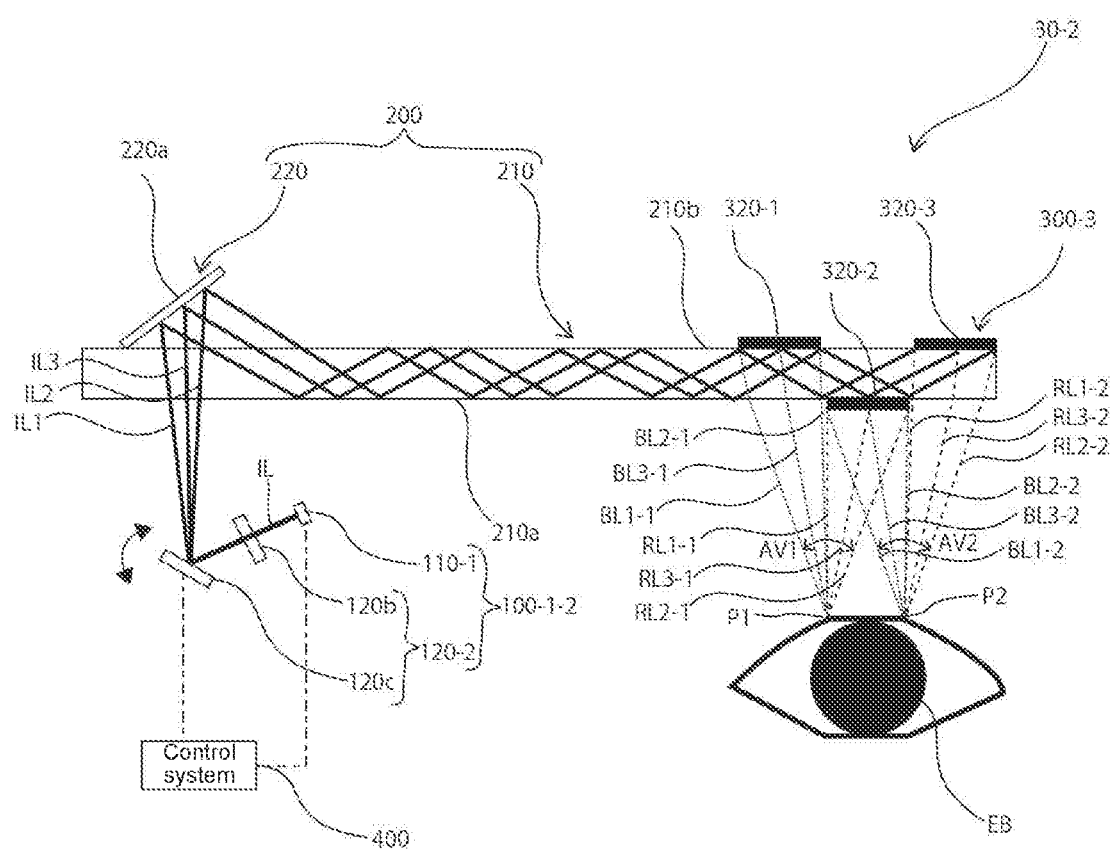
FIG. 19 illustrates a configuration of a display apparatus according to a second example of the third embodiment of the present technology.

As illustrated in FIG. 19, the display apparatus 30-2 of the second example of the third embodiment has a configuration similar to the configuration of the display apparatus 30-1 of the first example except for the configuration of a light-emitting system.

A light-emitting system of the display apparatus 30-2 of the second example has a configuration similar to the configuration of the light-emitting system 100-1-2 of the display apparatus 10-2 according to the second example of the first embodiment.

The display apparatus 30-2 can provide effects similar to the effects provided by the display apparatus 30-1 of the first example, and makes it possible to control respective pieces of scanning light (respective pieces of image light IL) individually.

[Display Apparatus According to Third Example of Third Embodiment of Present Technology]

A display apparatus 30-3 according to a third example of the third embodiment is described with reference to FIG. 20.

Figure 20:
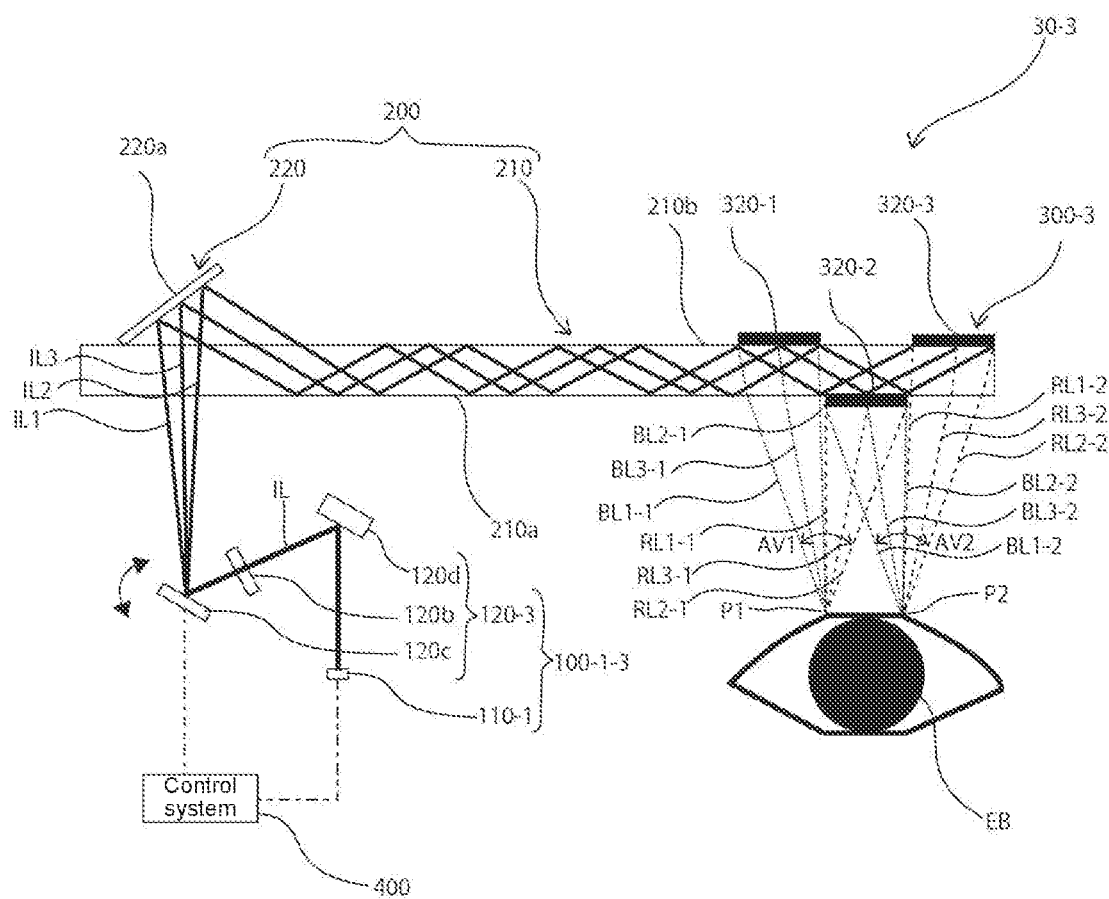
FIG. 20 illustrates a configuration of a display apparatus according to a third example of the third embodiment of the present technology.

As illustrated in FIG. 20, the display apparatus 30-3 of the third example of the third embodiment has a configuration similar to the configuration of the display apparatus 30-2 of the second example except for the configuration of a light-emitting system.

A light-emitting system of the display apparatus 30-3 of the third example has a configuration similar to the configuration of the light-emitting system 100-1-3 of the display apparatus 10-3 according to the third example of the first embodiment.

The display apparatus 30-3 can provide effects similar to the effects provided by the display apparatus 30-2 of the second example, and can display a high-quality color image in which a chromatic aberration has been corrected.

4. <Display Apparatus According to Fourth Embodiment of Present Technology>

A display apparatus 40 according to a fourth embodiment of the present technology is described with reference to the drawings.

[Display Apparatus According to First Example of Fourth Embodiment of Present Technology]

A display apparatus 40-1 according to a first example of the fourth embodiment is described with reference to FIGS. 21 to 24.

Figure 21:
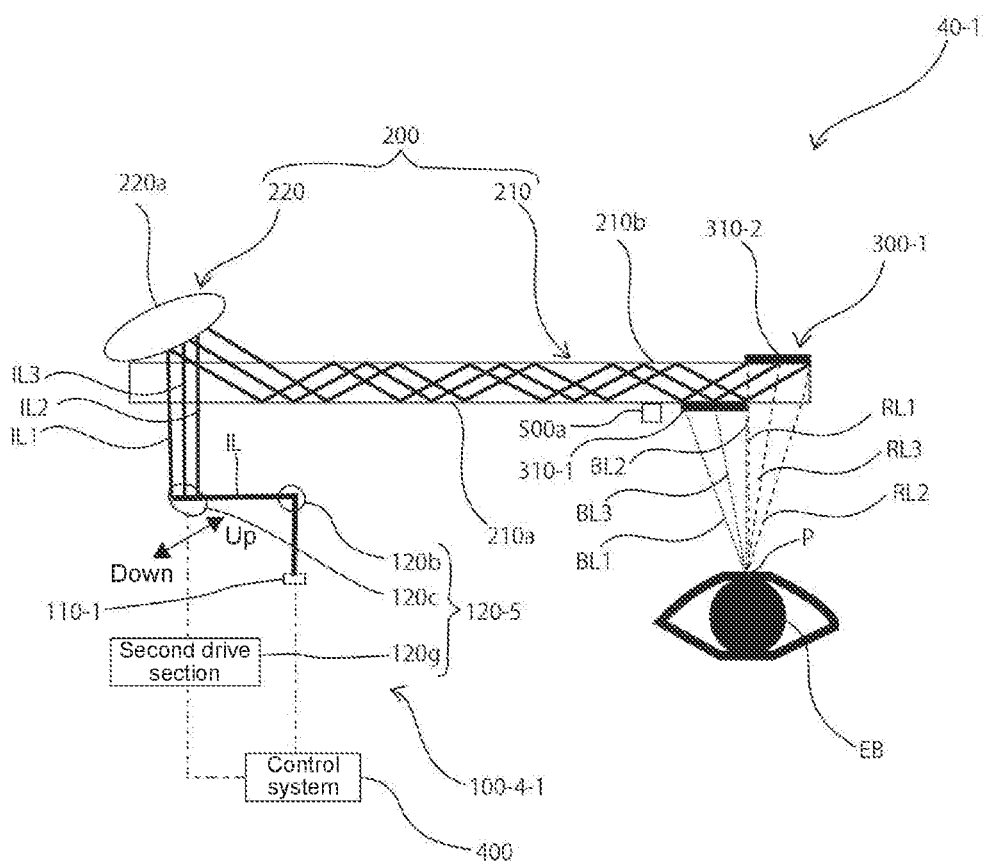
FIG. 21 illustrates a configuration of a display apparatus according to a first example of a fourth embodiment of the present technology.
Figure 22:
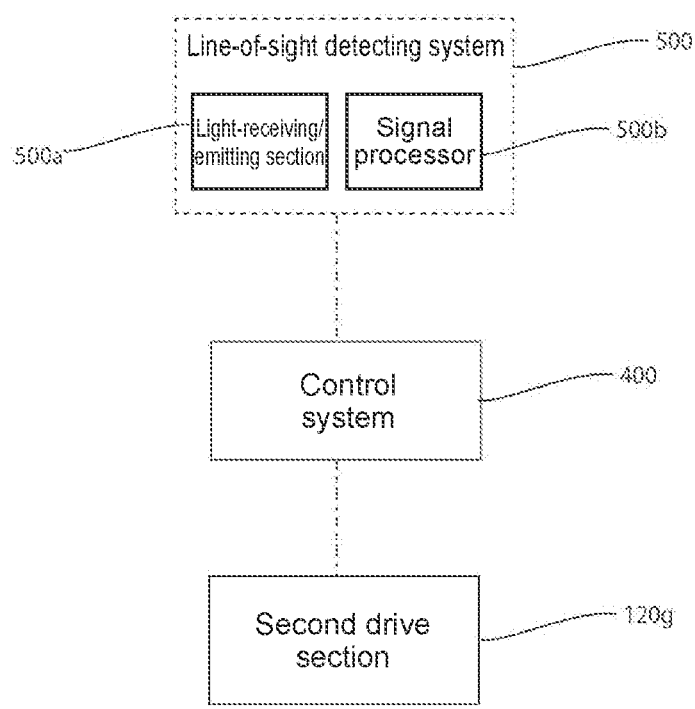
FIG. 22 is a block diagram illustrating the functionality of the display apparatus according to the first example of the fourth embodiment of the present technology.

As illustrated in FIGS. 21 and 22, the display apparatus 40-1 of the first example has a configuration similar to the configuration of the display apparatus 10-4 according to the fourth example of the first embodiment except for the configuration of a light-emitting system.

A light-emitting system 100-4-1 of the display apparatus 40-1 includes a second drive section 120g that drives the scanning optical element 120c in a direction of a vertical field of view of a user (for example, a direction vertical to the surface of the sheet of FIG. 21). Note that FIGS. 21, 23, and 24 perspectively illustrate the scanning optical element 120c and the reflective mirror 220a for convenience of description. Upward and downward directions indicated by arrows in FIGS. 21, 23, and 24, a direction of a movement of the eyeball EB, and a direction of a movement of the position P actually correspond to a direction vertical to the surface of the sheet of the figure (the upward and downward directions defined above).

The control system 400 controls the second drive section 120g on the basis of a result of detection performed by the line-of-sight detecting system 500.

Specifically, first, the position of the scanning optical element 120c when the position P (a light concentration point) is on the centrally situated eyeball EB, for example, as illustrated in FIG. 21, is set to be a reference position.

Figure 23:
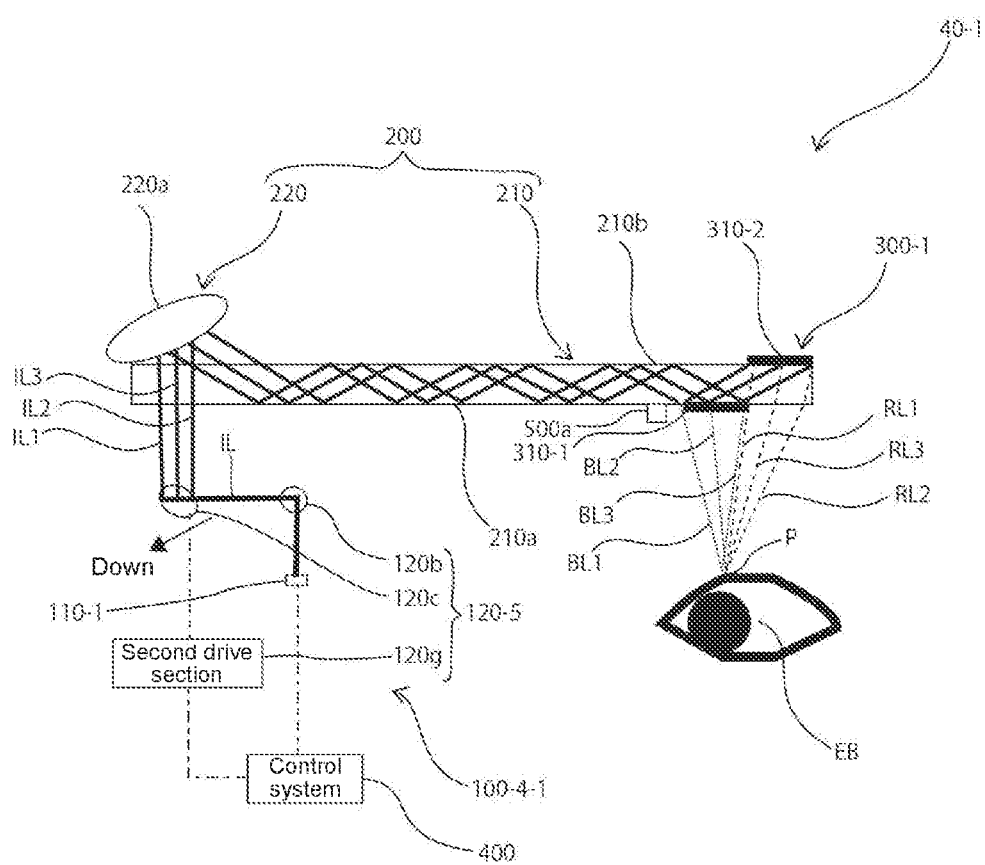
FIG. 23 illustrates an operation (a first operation) of the display apparatus according to the first example of the fourth embodiment of the present technology.

Next, when, for example, as illustrated in FIG. 23, the result of detection performed by the line-of-sight detecting system 500 shows that the eyeball EB has been moved downward, the control system 400 moves the scanning optical element 120c further downward than the reference position to shift the position P (the light concentration point) downward.

Figure 24:
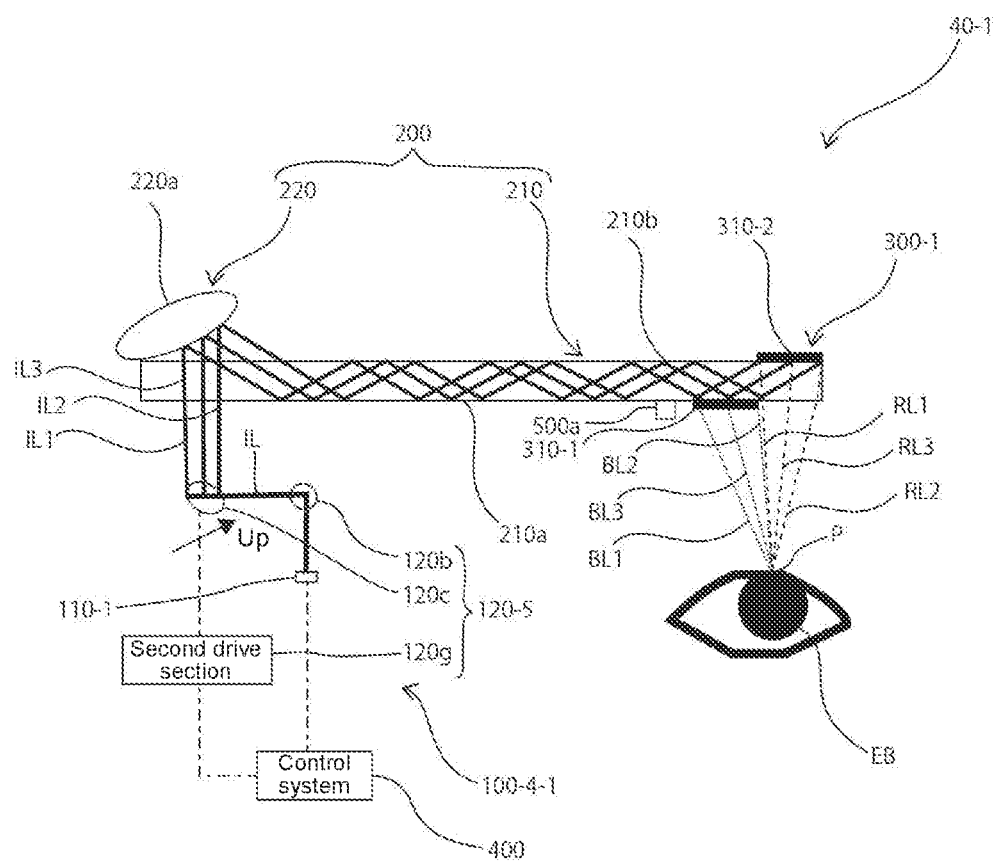
FIG. 24 illustrates an operation (a second operation) of the display apparatus according to the first example of the fourth embodiment of the present technology.

When, for example, as illustrated in FIG. 24, the result of detection performed by the line-of-sight detecting system 500 shows that the eyeball EB has been moved upward, the control system 400 moves the scanning optical element 120c further upward than the reference position to shift the position P (the light concentration point) upward.

As described above, it is possible to cause the position P (a light concentration point) to follow the position of the eyeball EB by moving the scanning optical element 120c according to a change in the position of the eyeball EB.

The display apparatus 40-1 can display a color image in a state of being successfully visually confirmed, regardless of the position of the eyeball EB.

[Display Apparatus According to Second Example of Fourth Embodiment of Present Technology]

A display apparatus 40-2 according to a second example of the fourth embodiment is described with reference to FIGS. 25 to 27.

Figure 25:
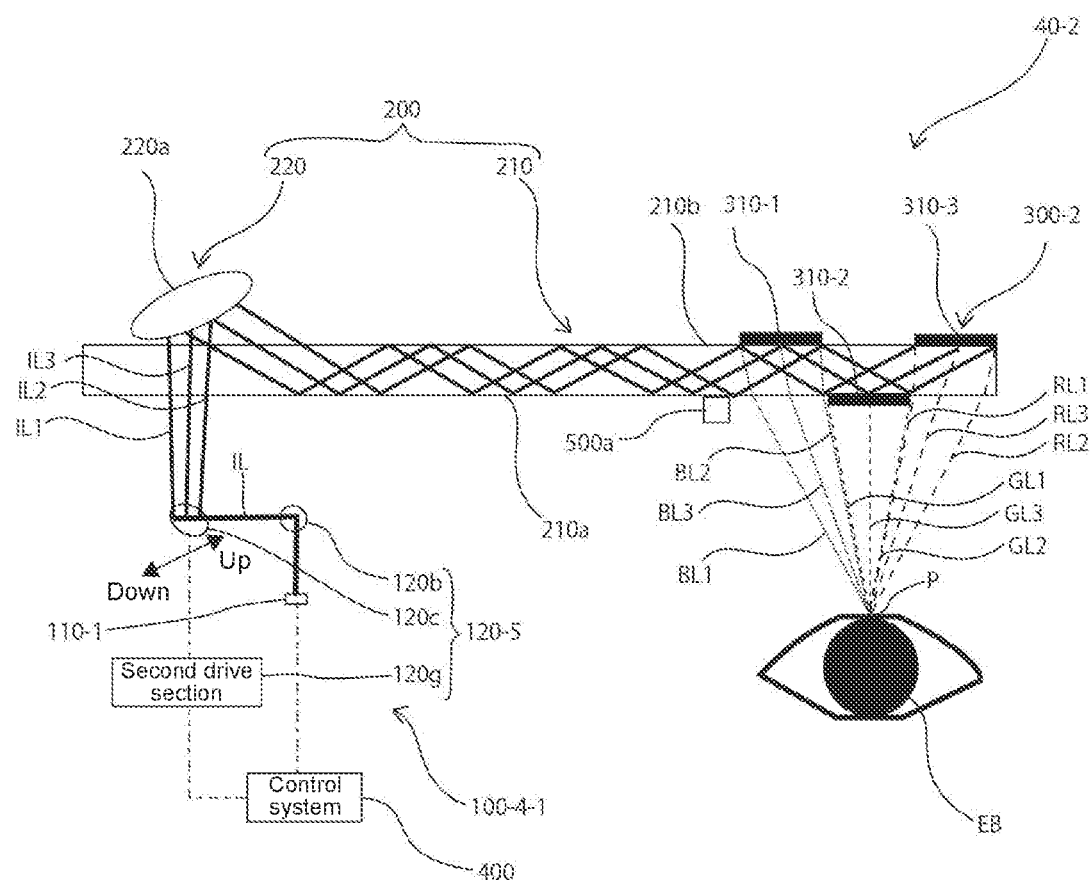
FIG. 25 illustrates a configuration of a display apparatus according to a second example of the fourth embodiment of the present technology.

As illustrated in FIG. 25, the display apparatus 40-2 of the first example has a configuration similar to the configuration of the display apparatus 20-4 according to the fourth example of the second embodiment except for the configuration of a light-emitting system.

A light-emitting system 100-4-1 of the display apparatus 40-2 includes the second drive section 120g driving the scanning optical element 120c in a direction of a vertical field of view of a user (for example, a direction vertical to the surface of the sheet of FIG. 25). Note that FIGS. 25 to 27 perspectively illustrate the scanning optical element 120c and the reflective mirror 220a for convenience of description. Upward and downward directions indicated by arrows in FIGS. 25 to 27, a direction of a movement of the eyeball EB, and a direction of a movement of the position P actually correspond to a direction vertical to the surface of the sheet of the figure (the upward and downward directions defined above).

The control system 400 controls the second drive section 120g on the basis of a result of detection performed by the line-of-sight detecting system 500.

Specifically, first, the position of the scanning optical element 120c when the position P (a light concentration point) is on the centrally situated eyeball EB, for example, as illustrated in FIG. 25, is set to be a reference position.

Figure 26:
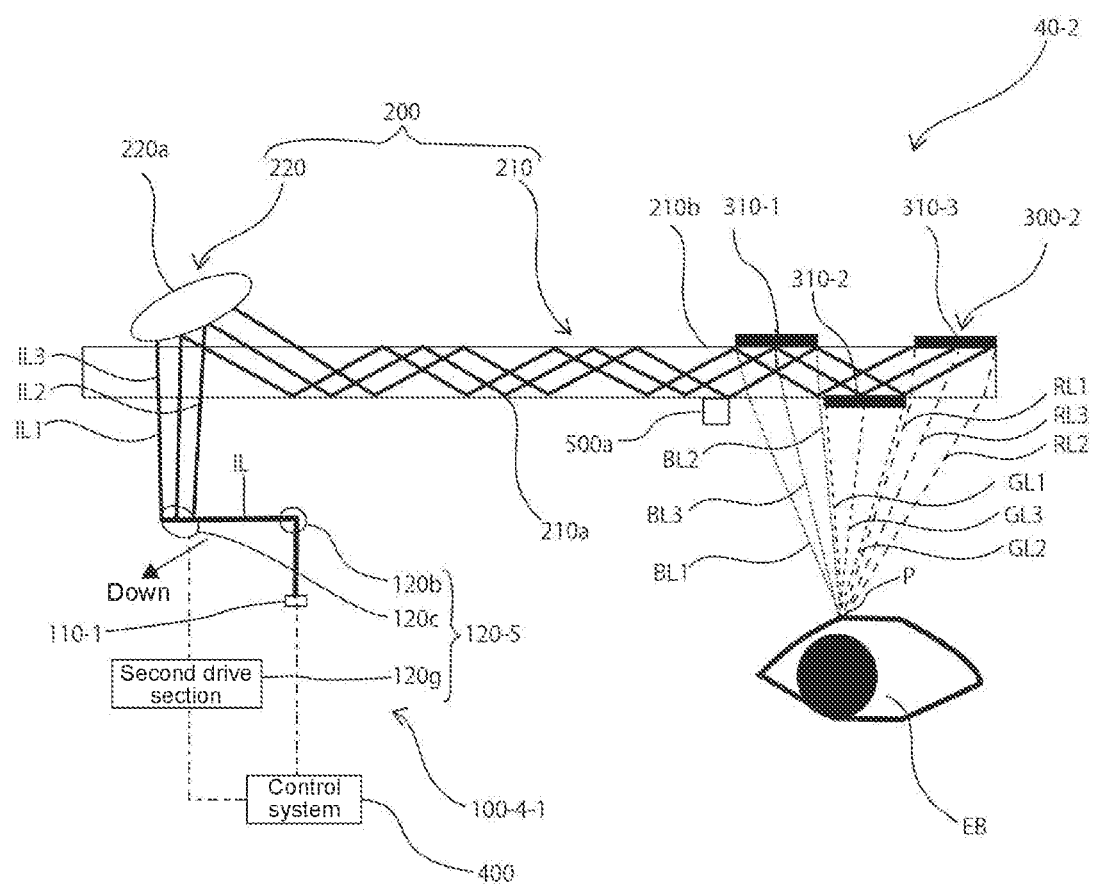
FIG. 26 illustrates an operation (a first operation) of the display apparatus according to the second example of the fourth embodiment of the present technology.

Next, when, for example, as illustrated in FIG. 26, the result of detection performed by the line-of-sight detecting system 500 shows that the eyeball EB has been moved downward, the control system 400 moves the scanning optical element 120c further downward than the reference position to shift the position P (the light concentration point) downward.

Figure 27:
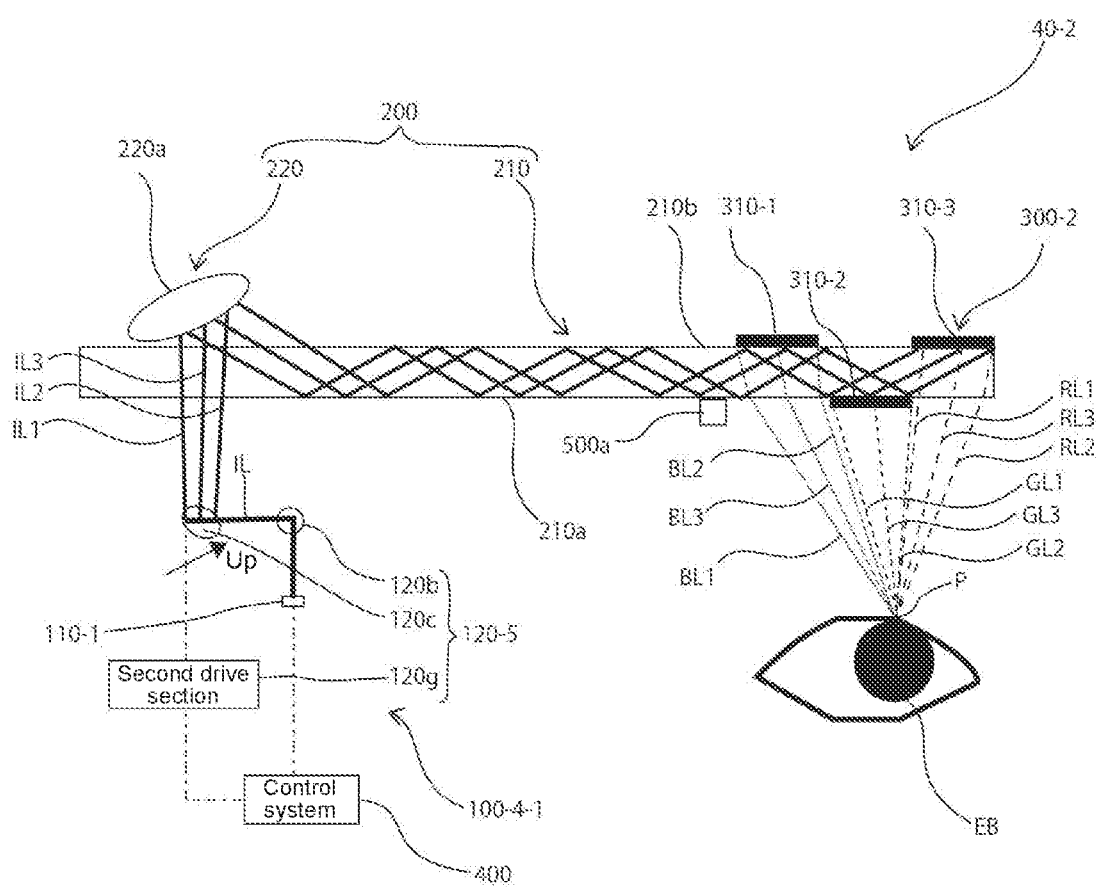
FIG. 27 illustrates an operation (a second operation) of the display apparatus according to the second example of the fourth embodiment of the present technology.

When, for example, as illustrated in FIG. 27, the result of detection performed by the line-of-sight detecting system 500 shows that the eyeball EB has been moved upward, the control system 400 moves the scanning optical element 120c further upward than the reference position to shift the position P (the light concentration point) upward.

As described above, it is possible to cause the position P to follow the position of the eyeball EB by moving the scanning optical element 120c according to a change in the position of the eyeball EB.

The display apparatus 40-2 can display a color image (such as a full-color image) in a state of being successfully visually confirmed, regardless of the position of the eyeball EB.

5. <Modifications of Present Technology>

The configurations of the display apparatuses of the respective embodiments of the present technology described above may be modified as appropriate.

For example, in each of the embodiments, the light guiding system does not necessarily have to include the light guiding plate. For example, the light guiding system may include at least one reflective mirror.

For example, the number of diffractive sections included in the diffractive section group may be four or more. In this case, the plurality of diffractive sections may include at least one diffractive section that includes a plurality of diffractive structures arranged in a layered formation, or at least one diffractive section in which a plurality of diffraction patterns is formed, or at least both the diffractive section including a plurality of diffractive structures arranged in a layered formation and the diffractive section in which a plurality of diffraction patterns is formed.

The wavelength selective properties and the arrangement of the plurality of diffractive sections included in the diffractive section group are not limited to those described in the embodiments above, and modifications may be made thereto as appropriate.

For example, in the first embodiment, one of the two diffractive sections may be a diffractive section that selectively diffracts red light RL from among entering light, and another of the two diffractive sections may be a diffractive section that selectively diffracts green light GL from among the entering light.

For example, in the first embodiment, one of the two diffractive sections may be a diffractive section that selectively diffracts blue light BL from among entering light, and another of the two diffractive sections may be a diffractive section that selectively diffracts green light GL from among the entering light.

For example, in each of the embodiments, the number of diffractive sections provided to the surface 210a in front and the surface 210b in back being included in the light guiding plate 210 may also be modified as appropriate.

In the first example of the first embodiment, the first example of the second embodiment, and the first example of the third embodiment, the diffusion member is arranged at the output side of the image light generator. However, an optical element (such as a lens or a mirror) other than the diffusion member may be arranged at the output side of the image light generator.

The entrance optical system 220 includes the reflective mirror 220a. However, the entrance optical system 220 may include a plurality of mirrors, or may include at least one lens, or may include a combination of at least one mirror and at least one lens.

For example, in the fourth embodiment, the position of the scanning optical element 120c is changed. However, the pose of the scanning optical element 120c may be changed instead of, or in addition to the change in the position of the scanning optical element 120c. The change in the pose of the scanning optical element 120c makes it possible to change an angle of incidence of entering light (image light IL) on the scanning optical element 120c.

For example, in the fourth embodiment, an optical element such as a diffusion plate, a freeform surface mirror, or a micromirror array off which entering light (image light IL) is diffusely reflected may be provided instead of the scanning optical element 120c. In this case, the optical element may be driven by the control system 400 through the second drive section 120g.

For example, in each of the embodiments, the light-emitting system may only include the image light generator. In other words, image light IL generated by the image light generator may enter the light guiding system directly. In this case, the number of pieces of image light IL may be one (for example, one of pieces of image light IL1 to IL3).

For example, in each of the embodiments, image light IL includes a plurality of pieces of light of bands of different colors (for example, at least two of pieces of light that are red light, blue light, and green light) as a plurality of pieces of light of different wavelengths. However, the image light IL is not limited thereto.

For example, in each of the embodiments, the image light IL may include a plurality of pieces of light of a band of one color as the plurality of pieces of light of different wavelengths. In this case, the diffractive sections of the plurality of diffractive sections may respectively diffract the pieces of light of the plurality of pieces of light of a band of one color. In this case, an image made up of a plurality of pieces of light of one color of different tones can be displayed at a wide angle of view.

Specifically, the image light IL may include a plurality of pieces of red light of different wavelengths. In this case, the diffractive sections of the plurality of diffractive sections may respectively selectively diffract the pieces of red light of the plurality of pieces of red light of different wavelengths.

The image light IL may include a plurality of pieces of green light of different wavelengths. In this case, the diffractive sections of the plurality of diffractive sections may respectively selectively diffract the pieces of green light of the plurality of pieces of green light of different wavelengths.

The image light IL may include a plurality of pieces of blue light of different wavelengths. In this case, the diffractive sections of the plurality of diffractive sections may respectively selectively diffract the pieces of blue light of the plurality of pieces of blue light of different wavelengths.

For example, when image light IL includes red light, green light, and blue light, an image made up of white light can be displayed at a wide angle of view by using a diffractive section in which three diffractive structures that respectively selectively diffract the red light, the green light, and the blue light are arranged in a layered formation.

For example, when image light IL includes red light, green light, and blue light, an image made up of white light can be displayed at a wide angle of view by using a diffractive section in which three diffraction patterns that respectively selectively diffract the red light, the green light, and the blue light are multiply formed.

The configurations of the examples of the respective embodiments may be combined without inconsistencies.

Further, the present technology may also take the following configurations.

(1) A display apparatus, including:
   a light-emitting system that emits image light that includes a plurality of pieces of light of different wavelengths;
   a light guiding system that guides the image light emitted by the light-emitting system; and
   a light deflecting system that deflects the plurality of pieces of light included in the image light guided by the light guiding system, and causes the plurality of pieces of deflected light to be incident on an eyeball from different directions.

(2) The display apparatus according to (1), in which
   the light guiding system includes
      a light guiding plate, and
      an entrance optical system that causes the image light emitted by the light-emitting system to enter the light guiding plate, and
   the image light entering the light guiding plate through the entrance optical system propagates through the light guiding plate while being totally reflected within the light guiding plate.

(3) The display apparatus according to (1) or (2), in which
   the light deflecting system includes a diffractive section group including a plurality of diffractive sections and successively selectively diffracting the plurality of pieces of light included in the image light propagating through the light guiding plate while being totally reflected within the light guiding plate.

(4) The display apparatus according to (3), in which
   diffractive sections of the plurality of diffractive sections are provided at different positions on a propagation route of the image light in the light guiding plate, and
   at least two of the diffractive sections of the plurality of diffractive sections have wavelength selective properties with respect to different wavelengths from among wavelengths of the plurality of pieces of light included in the image light.

(5) The display apparatus according to (3) or (4), in which
   diffractive sections of the plurality of diffractive sections are provided at different positions on a propagation route of the image light in the light guiding plate, and
   at least two of the diffractive sections of the plurality of diffractive sections have wavelength selective properties with respect to the same wavelength from among wavelengths of the plurality of pieces of light included in the image light.

(6) The display apparatus according to any one of (3) to (5), in which
   the diffractive section group diffracts at least two of the plurality of pieces of light included in the image light such that the at least two of the plurality of pieces of light included in the image light are headed for one position on the eyeball.

(7) The display apparatus according to any one of (3) to (6), in which
   the diffractive section group diffracts at least two of the plurality of pieces of light included in the image light such that the at least two of the plurality of pieces of light included in the image light are headed for different positions on the eyeball.

(8) The display apparatus according to any one of (3) to (7), in which
   a portion of the plurality of diffractive sections is provided to a surface of the light guiding plate that is situated relatively close to the eyeball, and
   another portion of the plurality of diffractive sections is provided to a surface of the light guiding plate that is situated relatively away from the eyeball.

(9) The display apparatus according to any one of (3) to (8), in which
   the plurality of diffractive sections includes a diffractive section including a plurality of diffractive structures arranged in a layered formation in a thickness direction of the light guiding plate, and
   diffractive structures of the plurality of diffractive structures have wavelength selective properties with respect to different wavelengths from among wavelengths of the plurality of pieces of light included in the image light.

(10) The display apparatus according to any one of (3) to (9), in which
   the plurality of diffractive sections includes a diffractive section in which a plurality of diffraction patterns is formed, and
   diffraction patterns of the plurality of diffraction patterns have wavelength selective properties with respect to different wavelengths from among wavelengths of the plurality of pieces of light included in the image light.

(11) The display apparatus according to (2), in which
   the entrance optical system includes an optical member that causes the image light emitted by the light-emitting system to enter the light guiding plate at an angle of incidence at which the image light is totally reflected within the light guiding plate.

(12) The display apparatus according to (11), in which
   the optical member is a reflective mirror.

(13) The display apparatus according to (12), in which
   the image light emitted by the light-emitting system is transmitted through the light guiding plate to be incident on the reflective mirror.

(14) The display apparatus according to any one of (2) and (11) to (13), in which
   the light-emitting system includes
      an image light generator that generates the image light, and
      an optical system that guides the image light generated by the image light generator to the entrance optical system.

(15) The display apparatus according to (14), in which
   the optical system includes a diffusion member that is arranged in a path of the image light between the image light generator and the entrance optical system and diffuses the image light.
(16) The display apparatus according to (14), in which the optical system includes a scanning optical element that is arranged in a path of the image light between the image light generator and the entrance optical system and scans the image light.
(17) The display apparatus according to (14), in which the optical system includes a chromatic-aberration-correction diffractive section that is arranged in a path of the image light between the image light generator and the entrance optical system and corrects a chromatic aberration.
(18) The display apparatus according to (16), in which the optical system includes a chromatic-aberration-correction diffractive section that is arranged in a path of the image light between the image light generator and the scanning optical element and corrects a chromatic aberration.
(19) The display apparatus according to (14), in which the optical system includes
an optical element that is arranged in a light path between the image light generator and the entrance optical system, and
a drive section that is capable of changing a position of the optical element, a pose of the optical element, or both the position and the pose.
(20) The display apparatus according to (19), further including:
a line-of-sight detecting system that detects a line of sight that corresponds to an orientation of the eyeball; and
a control system that controls the drive section on the basis of a result of the detection performed by the line-of-sight detecting system.

REFERENCE SIGNS LIST

| | |
|---|---|
| 10 (10-1 to 10-4), 20 (20-1 to 20-4), 30 (30-1 to 30-3), 40 (40-1 and 40-2) | display apparatus |
| 100 (100-1-1 to 100-4-1) | light-emitting system |
| 110 (110-1 and 110-2) | image light generator |
| 120 (120-1 to 120-5) | optical system |
| 120b | light concentration optical element (optical element) |
| 120c | scanning optical element (optical element) |
| 120d | chromatic-aberration-correction diffractive section |
| 120e | first drive section (drive section) |
| 120g | second drive section (drive section) |
| 200 | light guiding system |
| 210 | light guiding plate |
| 210a | surface being included in light guiding plate and situated relatively close to eyeball |
| 210b | surface being included in light guiding plate and situated relatively away from eyeball |
| 220 | entrance optical system |
| 220a | reflective mirror |
| 300 (300-1 to 300-3) | light deflecting system |
| 310 (310-1 to 310-3), 320 (320-1 to 320-3) | diffractive section |
| 400 | control system |
| 500 | line-of-sight detecting system |
| EB | eyeball |

The invention claimed is:
1. A display apparatus, comprising:
a light-emitting system that emits image light that includes a plurality of pieces of light of different wavelengths;
a light guiding system that guides the image light emitted by the light-emitting system, wherein the light guiding system includes a first light guiding plate; and
a light deflecting system that deflects the plurality of pieces of light included in the image light guided by the light guiding system, and causes the plurality of pieces of deflected light to be incident on an eyeball from different directions, wherein the light deflecting system includes:
a first diffractive section disposed at a first position on a first side of the first light guiding plate, wherein a first one of the plurality of pieces of light is deflected by the first diffractive section so as to pass out of the first light guiding plate and to be incident on the eyeball; and
a second diffractive section disposed at a second position on a second side of the first light guiding plate, wherein a second one of the plurality of pieces of light is deflected by the second diffractive section so as to pass out of the first light guiding plate and to be incident on the eyeball, and wherein the first diffractive section does not overlap the second diffractive section when viewed along a line perpendicular to a plane of the first side of the first light guiding plate.
2. The display apparatus according to claim 1, wherein the light guiding system includes
an entrance optical system that causes the image light emitted by the light-emitting system to enter the light guiding plate,
wherein the image light entering the light guiding plate through the entrance optical system propagates through the light guiding plate while being totally reflected within the light guiding plate.
3. The display apparatus according to claim 2, wherein the sections and successively selectively diffract the plurality of pieces of light included in the image light propagating through the light guiding plate while being totally reflected within the light guiding plate.
4. The display apparatus according to claim 3, wherein the diffractive sections have wavelength selective properties with respect to different wavelengths from among wavelengths of the plurality of pieces of light included in the image light.
5. The display apparatus according to claim 3, wherein the light deflecting system includes a plurality of diffractive sections, and
wherein at least the first and second diffractive sections of the plurality of diffractive sections have wavelength selective properties with respect to a same wavelength from among wavelengths of the plurality of pieces of light included in the image light.
6. The display apparatus according to claim 3, wherein the first and second pieces of light included in the image light are headed for one position on the eyeball.
7. The display apparatus according to claim 3, wherein of the first and second pieces of light included in the image light are headed for different positions on the eyeball.
8. The display apparatus according to claim 3, wherein the first diffractive section is provided on a surface of the light guiding plate that is situated relatively close to the eyeball, and the second diffractive section is provided to a surface of the light guiding plate that is situated relatively away from the eyeball.

9. The display apparatus according to claim 3, wherein the light deflecting system includes a
plurality of diffractive sections, wherein at least one of the diffractive sections includes a plurality of diffractive structures arranged in a layered formation in a thickness direction of the light guiding plate, and
wherein diffractive structures of the plurality of diffractive structures have wavelength selective properties with respect to different wavelengths from among wavelengths of the plurality of pieces of light included in the image light.

10. The display apparatus according to claim 3, wherein the light deflecting system includes a
plurality of diffractive sections that include a diffractive section in which a plurality of diffraction patterns is formed, and
wherein diffraction patterns of the plurality of diffraction patterns have wavelength selective properties with respect to different wavelengths from among wavelengths of the plurality of pieces of light included in the image light.

11. The display apparatus according to claim 2, wherein the entrance optical system includes an optical member that causes the image light emitted by the light-emitting system to enter the light guiding plate at an angle of incidence at which the image light is totally reflected within the light guiding plate.

12. The display apparatus according to claim 11, wherein the optical member is a reflective mirror.

13. The display apparatus according to claim 12, wherein the image light emitted by the light-emitting system is transmitted through the light guiding plate to be incident on the reflective mirror.

14. The display apparatus according to claim 2, wherein the light-emitting system includes
an image light generator that generates the image light, and
an optical system that guides the image light generated by the image light generator to the entrance optical system.

15. The display apparatus according to claim 14, wherein the optical system includes a diffusion member that is arranged in a path of the image light between the image light generator and the entrance optical system and diffuses the image light.

16. The display apparatus according to claim 14, wherein the optical system includes a scanning optical element that is arranged in a path of the image light between the image light generator and the entrance optical system and scans the image light.

17. The display apparatus according to claim 14, wherein the optical system includes a chromatic-aberration-correction diffractive section that is arranged in a path of the image light between the image light generator and the entrance optical system and corrects a chromatic aberration.

18. The display apparatus according to claim 16, wherein the optical system includes a chromatic-aberration-correction diffractive section that is arranged in a path of the image light between the image light generator and the scanning optical element and corrects a chromatic aberration.

19. The display apparatus according to claim 14, wherein the optical system includes
an optical element that is arranged in a light path between the image light generator and the entrance optical system, and
a drive section that is capable of changing a position of the optical element, a pose of the optical element, or both the position and the pose.

20. The display apparatus according to claim 19, further comprising:
a line-of-sight detecting system that detects a line of sight that corresponds to an orientation of the eyeball; and
a control system that controls the drive section on a basis of a result of the detection performed by the line-of-sight detecting system.

* * * * *